US012291049B2

(12) United States Patent
Kobayashi et al.

(10) Patent No.: US 12,291,049 B2
(45) Date of Patent: May 6, 2025

(54) PRINTING DEVICE

(71) Applicant: BROTHER KOGYO KABUSHIKI KAISHA, Nagoya (JP)

(72) Inventors: Akihito Kobayashi, Konan (JP); Yugo Fukui, Kariya (JP); Noriyuki Kawamata, Nagoya (JP); Yutaka Takagiwa, Kariya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 154 days.

(21) Appl. No.: 18/115,490

(22) Filed: Feb. 28, 2023

(65) Prior Publication Data

US 2023/0271440 A1 Aug. 31, 2023

(30) Foreign Application Priority Data

Feb. 28, 2022 (JP) ................................ 2022-030086

(51) Int. Cl.
*B41J 2/045* (2006.01)
*B41M 5/00* (2006.01)

(52) U.S. Cl.
CPC ........ *B41M 5/0017* (2013.01); *B41J 2/04566* (2013.01); *B41J 2/04581* (2013.01)

(58) Field of Classification Search
CPC .. B41M 5/0017; B41J 3/4078; B41J 2/04566; B41J 2/04581; B41J 29/38; B41J 11/0015; B41J 2/211
See application file for complete search history.

(56) References Cited

U.S. PATENT DOCUMENTS

2019/0283458 A1 9/2019 Ohnishi et al.

FOREIGN PATENT DOCUMENTS

JP 2019-155726 7/2022

*Primary Examiner* — Kristal Feggins
(74) *Attorney, Agent, or Firm* — K&L Gates LLP

(57) ABSTRACT

A printing device includes a head including a nozzle configured to ejects ink, a platen including a support surface configured to support a printing medium to which a pretreatment liquid is applied, the pretreatment liquid containing a volatile component that reacts with the ink, and a humidified air supply port configured to supply humidified air to the support surface of the platen that supports the printing medium, the humidified air supply port being provided around the platen in which the support surface of the platen is disposed at a printing position facing the nozzle.

11 Claims, 14 Drawing Sheets

PRINTING DEVICE

REFERENCE TO RELATED APPLICATIONS

This application claims priority from Japanese Patent Application No. 2022-030086 filed on Feb. 28, 2022. The entire content of the priority application is incorporated herein by reference.

BACKGROUND ART

A related art describes a printing device including an inkjet head that evaporates a liquid pretreatment agent before ejecting a color ink onto a printing medium to which the pretreatment agent is applied, and then ejects the color ink. Accordingly, drying of the pretreatment agent can be appropriately accelerated before the color ink is ejected.

DESCRIPTION

However, in the printing device described in the related art, in a case where the pretreatment agent applied to the printing medium volatilizes during printing, a volatile component of the pretreatment agent may react with the ink in a nozzle of the inkjet head. A reaction between the ink and the volatile component of the pretreatment agent causes problems such as aggregation of the ink in the nozzle, occurrence of ejection failure, and occurrence of color change in the ink.

Therefore, an object of the present disclosure is to provide a printing device capable of reduce occurrence of a problem due to a reaction between an ink in a nozzle and a volatile component of a pretreatment liquid.

The printing device includes a humidified air supply port configured to supply humidified air to a support surface of a platen that supports a printing medium. The humidified air supply port is provided around the platen in which the support surface of the platen is disposed at a printing position facing the nozzle.

It is possible to supply humidified air from a humidified air supply port to a support surface of a platen disposed at a printing position. Therefore, in a case where printing is performed by ejecting ink from a nozzle of a head onto a printing medium to which a pretreatment agent is applied, it is possible to supply the humidified air onto the printing medium, and at the printing position, a volatile component of the pretreatment liquid applied to the printing medium is less likely to volatilize, and the volatile component itself of the pretreatment liquid is less likely to reach the nozzle. Therefore, it is possible to reduce an occurrence of a problem due to a reaction between the ink in the nozzle and the volatile component of the pretreatment liquid.

A printing device 1 according to the present disclosure will be described with reference to the drawings. In the following description, an up-down direction and a front-rear direction ("one direction" of the present disclosure) are defined with reference to a state (state in FIG. 1) in which the printing device 1 is provided in a usable manner, and a left-right direction ("orthogonal direction" of the present disclosure) is defined in a case where the printing device 1 is viewed from the front. In the following description, the left-right direction may be referred to as a main scanning direction, and the front-rear direction may be referred to as a sub-scanning direction.

Figure 1:
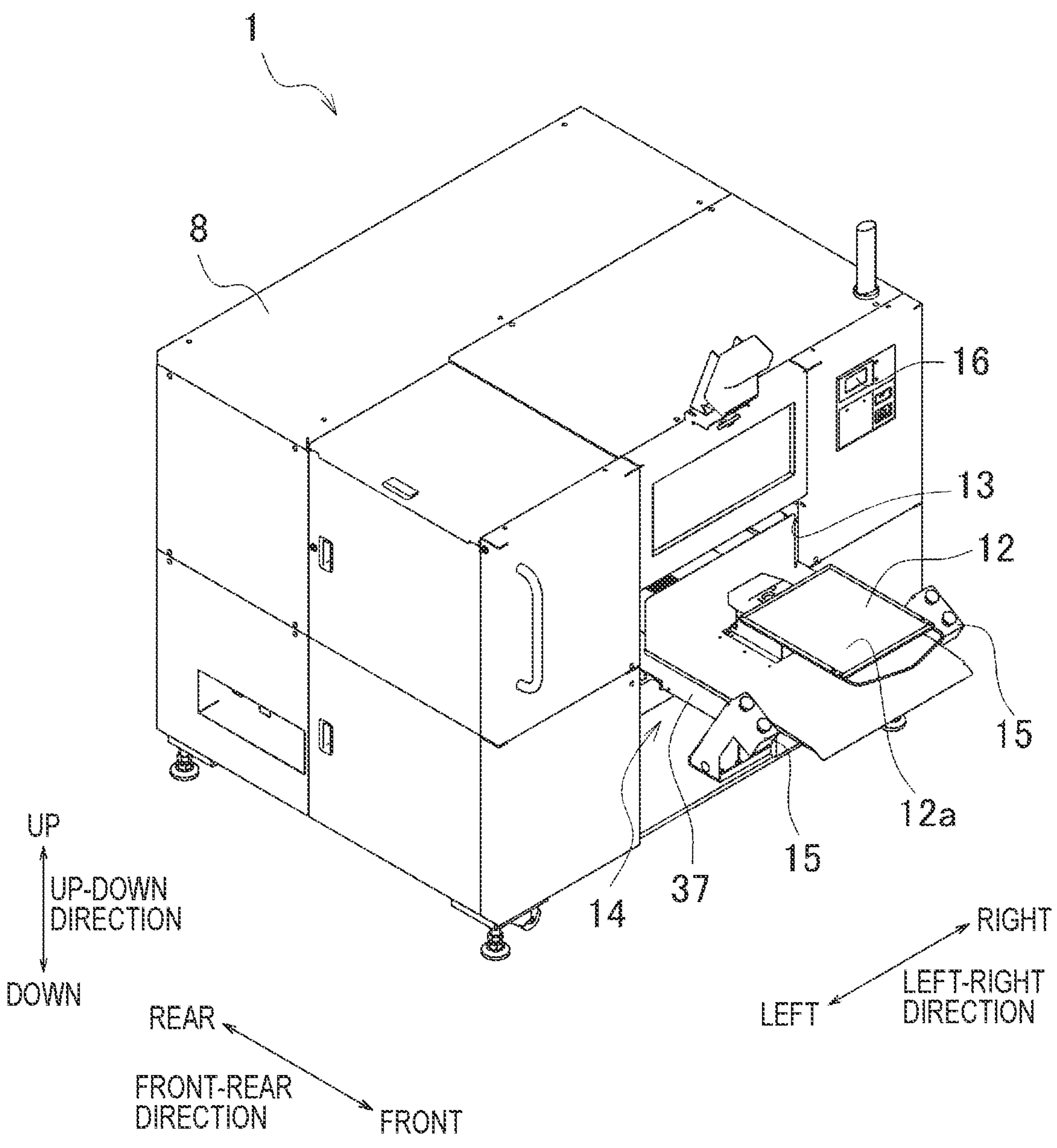
FIG. 1 is a schematic perspective view of a printing device.

The printing device 1 shown in FIG. 1 is an inkjet printer, and performs printing by ejecting ink onto a printing medium. The printing device 1 can print a color image, on the printing medium, using inks of five colors, that is, white, black, yellow, cyan, and magenta inks. The printing medium is a fabric, paper, or the like. In the present embodiment, the printing medium is, for example, a T-shirt containing polyester fibers. In a case where the printing device 1 performs the printing on the printing medium (T-shirt), the printing medium to which a pretreatment liquid is applied in advance is disposed on the platen 12. The pretreatment liquid reacts with the ink ejected onto the pretreatment liquid to aggregate components of the ink, thereby preventing an occurrence of smudge. A volatile component of the pretreatment liquid contains an organic acid such as formic acid.

Hereinafter, the white ink among the inks of five colors is referred to as a "white ink". Among the inks of five colors, the inks of four colors, which are the black, cyan, yellow, and magenta inks, are collectively referred to, or when any one of the inks is not specified, the inks of four colors are referred to as "color inks". When the white ink and the color inks are collectively referred to, or when any one of the white ink and the color inks is not specified, the white ink and the color inks are simply referred to as an "ink". The white ink is used for printing a portion representing white of an image or a base of the color inks. The color inks are ejected onto the base formed by the white ink, and is used for printing the color image.

Figure 2:
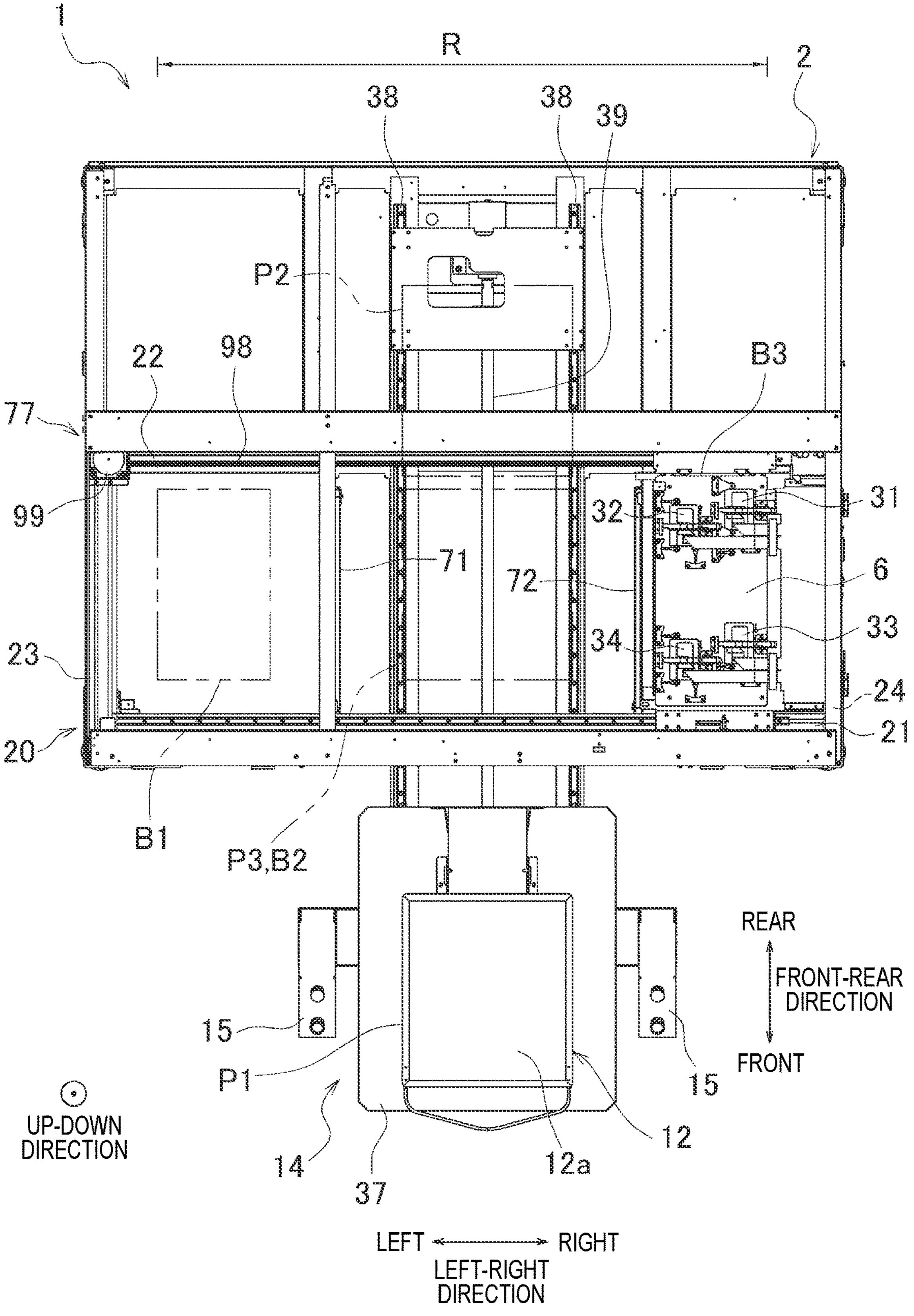
FIG. 2 is a plan view showing an internal structure of the printing device shown in FIG. 1.

An external configuration of the printing device 1 will be described with reference to FIGS. 1 to 3. As shown in FIG. 1, the printing device 1 includes a housing 8, the platen 12, a conveyance mechanism 14, operation portions 15, and a display screen 16. The housing 8 has a substantially rectangular parallelepiped shape, and a rectangular platen opening 13 is formed substantially at a center of a front surface in the left-right and up-down directions. Five cartridges (not shown) containing the inks of five colors are housed in the housing 8. As shown in FIG. 2, the platen 12 is formed of a plate-shaped member having a substantially rectangular planar shape. An upper surface of the platen 12 is a support surface 12*a* configured to support the printing medium. The support surface 12*a* has a quadrangular shape.

The operation portions 15 are provided at left and right end portions of a platen support portion 37 (to be described later) protruding forward from the platen opening 13. The operation portions 15 output information corresponding to an operation of a user to a controller 80 to be described later. The user can input a print start command (including print data) for starting the printing by the printing device 1 to the controller 80 by operating the operation portions 15. The display screen 16 is provided at an upper right portion of the front surface of the housing 8 than the platen opening 13. The display screen 16 displays various types of information. Therefore, an operator operates the printing device 1 from a front side of the printing device 1.

The conveyance mechanism ("moving mechanism" of the present disclosure) 14 conveys the platen 12, on which the printing medium is disposed, between an inside and an outside of the housing 8 through the platen opening 13. The platen 12 is disposed at a printing position P3, which is indicated by a two-dot chain line in FIG. 2, inside the housing 8 shown in FIG. 2, and the inks are ejected from heads 30 to be described later to perform the printing. As shown in FIG. 2, the conveyance mechanism 14 includes the platen support portion 37, a pair of left and right rails 38, a transmission member 39, and a sub-scanning motor 26 (see FIG. 9).

Figure 3:
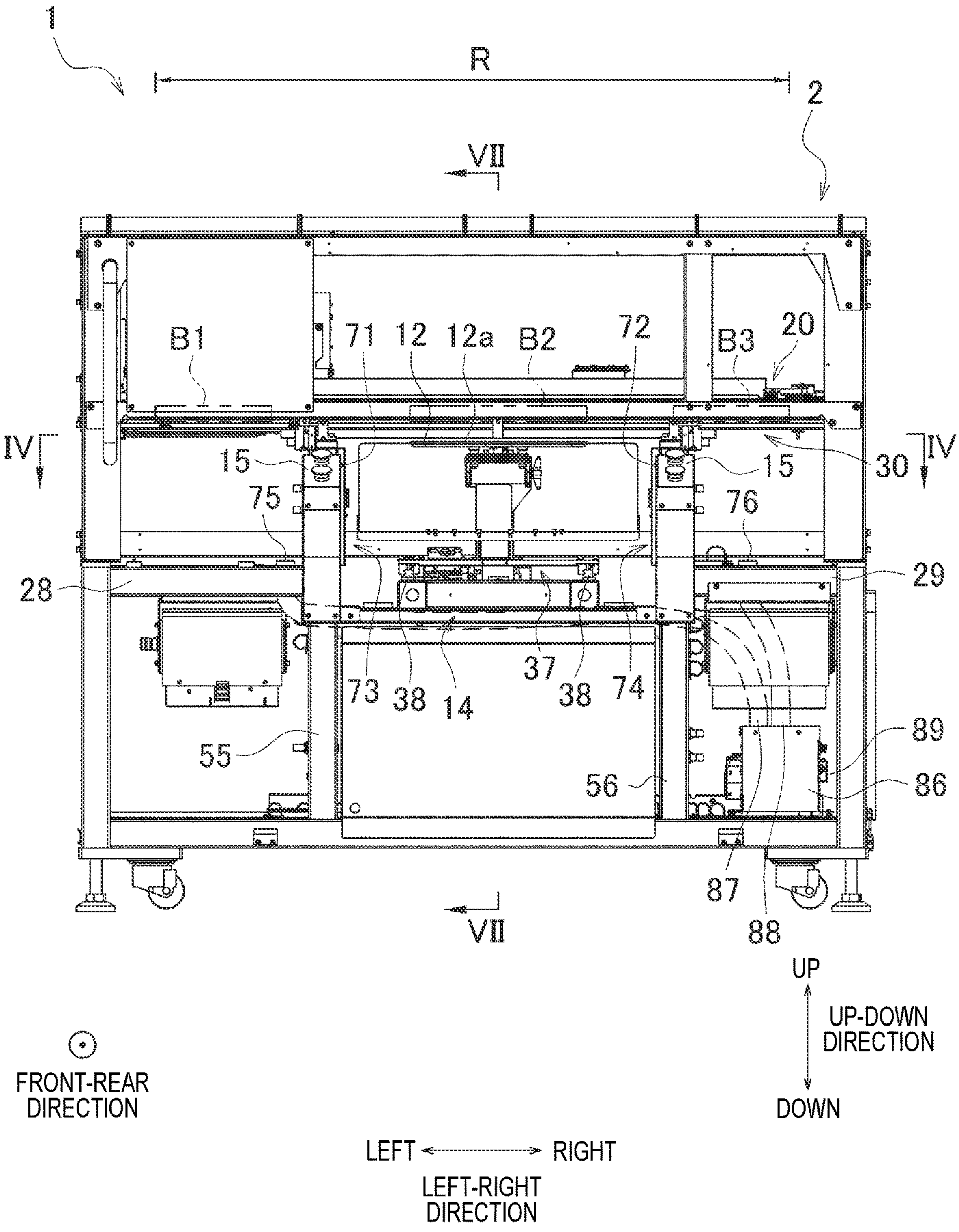
FIG. 3 is a front view showing the internal structure of the printing device shown in FIG. 1.

As shown in FIGS. 2 and 3, the platen support portion 37 is configured to support the platen 12 from below. The pair of left and right rails 38 extend in the front-rear direction and are configured to support the platen support portion 37 to be movable in the front-rear direction. Front ends of the pair of rails 38 are located forward than the front surface of the housing 8. The transmission member 39 is connected to the platen support portion 37 and the sub-scanning motor 26, and is configured to move the platen support portion 37 in the front-rear direction along a conveyance path defined by the pair of left and right rails 38, according to driving of the sub-scanning motor 26. That is, the platen 12 moves in the front-rear direction by the driving of the sub-scanning motor 26. Accordingly, the conveyance mechanism 14 is configured to move the platen 12 in the front-rear direction between a pair of inner walls 71 and 72, which will be described later. The left-right direction is a scanning direction of the heads 30 to be described later, and, in the present embodiment, the left-right direction is the main scanning direction.

In a state in which the platen 12 is disposed in front of the front surface of the housing 8, that is, outside the housing 8, the operator disposes the printing medium on the support surface 12*a* of the platen 12. That is, a position of the platen 12 shown in FIG. 2 is a support position P1 at which the printing medium is supported by the platen 12. Before printing on the printing medium, the platen 12 moves from the support position P1 to a pre-printing standby position P2, which is indicated by a two-dot chain line in FIG. 2. The pre-printing standby position P2 is located behind the printing position P3 and at a rear end portion of a conveyance path of the platen 12. The platen 12 disposed at the pre-printing standby position P2 does not face the heads 30 even in a case where the heads 30 to be described later move in the main scanning direction. The printing position P3 is a position, of the conveyance path of the platen 12, that overlaps in the up-down direction with movement paths of the heads 30 in the main scanning direction, which will be described later. The movement paths of the heads 30 in the main scanning direction are paths between a rear end of the rearmost head 30 (white head 31) and a front end of the frontmost head 30 (color head 34).

An internal structure of the printing device 1 will be described with reference to FIGS. 2 to 8. As shown in FIG. 2, the printing device 1 includes, inside the housing 8, a frame body 2, the pair of inner walls 71 and 72, partition plates 28 and 29 (see FIG. 3), heads 31 to 34, a moving mechanism 77, suction mechanisms 73 and 74 (see FIG. 3), two humidified air supply pipes 81 and 82 (see FIG. 4), and a humidifier 86 (see FIG. 3).

Figure 4:
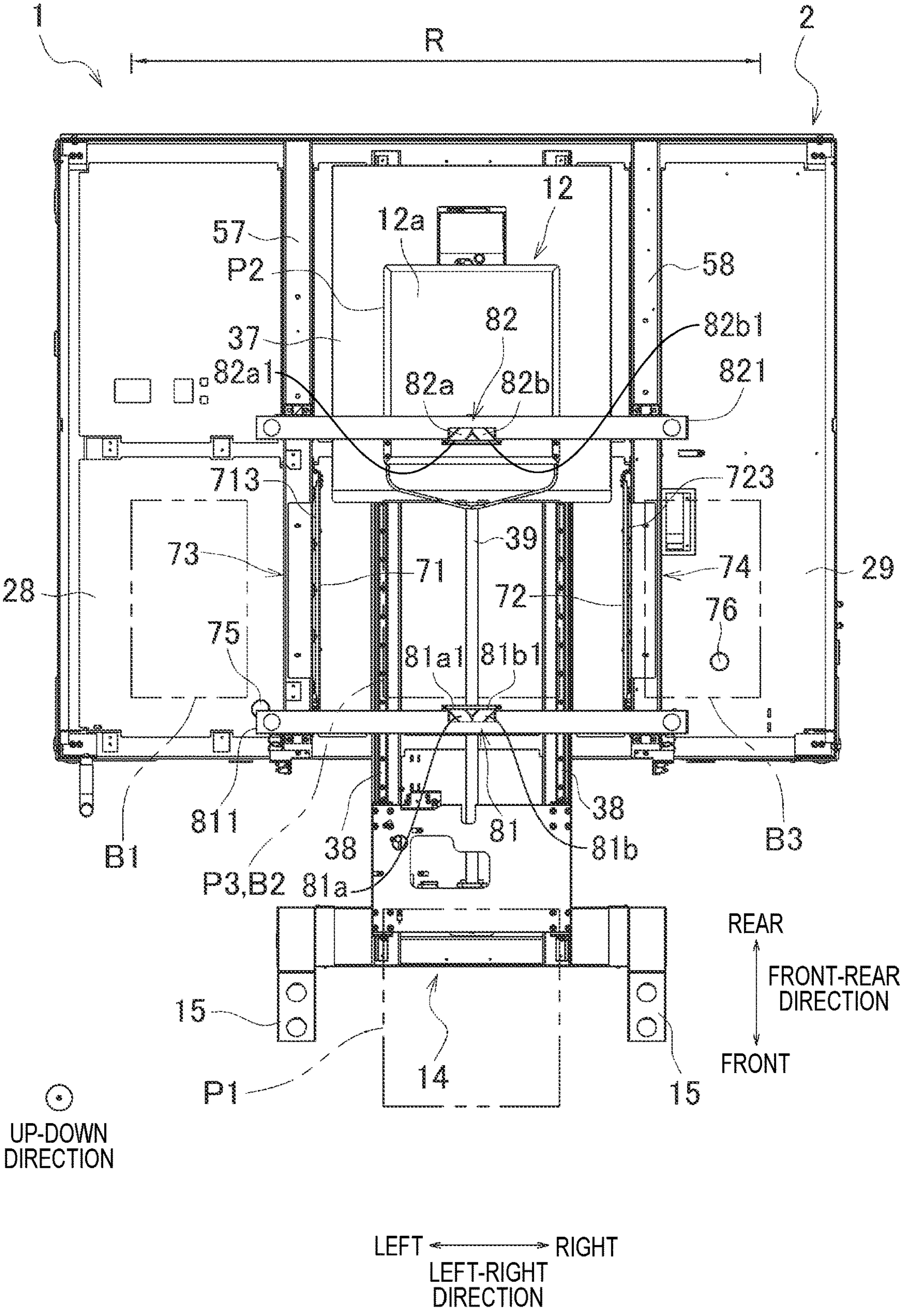
FIG. 4 is a cross-sectional view taken along a line IV-IV shown in FIG. 3.

As shown in FIGS. 2 to 4, the frame body 2 is formed in a lattice shape by a plurality of shafts including shafts 57 and 58 and extending in the front-rear direction, a plurality of shafts extending in the left-right direction, and a plurality of shafts including shafts 55 and 56 and extending in the up-down direction. The moving mechanism 77 includes a guide shaft 20 fixed to the frame body 2 and a carriage 6 fixed to the frame body 2. As shown in FIG. 2, the guide shaft 20 includes a front shaft 21, a rear shaft 22, a left shaft 23, and a right shaft 24.

As shown in FIG. 2, the front shaft 21 is disposed at a front end portion of the frame body 2, and extends in the left-right direction from a left end portion to a right end portion of the frame body 2. The rear shaft 22 is disposed substantially at a center of the frame body 2 in the front-rear direction, and extends in the left-right direction from a left end portion to a right end portion of the frame body 2. The left shaft 23 is disposed at the left end portion of the frame body 2, and extends, in the front-rear direction, from a left end of the front shaft 21 to a left end of the rear shaft 22. The right shaft 24 is disposed at the right end portion of the frame body 2, and extends, in the front-rear direction, from a right end of the front shaft 21 to a right end of the rear shaft 22. The front shaft 21 and the rear shaft 22 support the carriage 6. The conveyance mechanism 14 is fixed to the frame body 2.

As shown in FIGS. 2 to 4, the pair of inner walls 71 and 72 are disposed to face each other along the left-right direction and to be separated from each other. For example, as shown in FIG. 2, the pair of inner walls 71 and 72 are disposed to sandwich the printing position P3, in the left-right direction in plan view, where the platen 12 is disposed. The inner walls 71 and 72 extend in the up-down direction and the front-rear direction below the guide shaft 20 and are fixed to the frame body 2. The inner wall 71 is provided on a left side of the platen 12 disposed at the printing position P3, and is fixed to the shaft 57. The inner wall 72 is provided on a right side of the platen 12 disposed at the printing position P3, and is fixed to the shaft 58. As shown in FIG. 2, at least a portion of each of the inner walls 71 and 72 is located between the front shaft 21 and the rear shaft 22, in the front-rear direction.

As shown in FIGS. 3 and 4, the partition plate 28 is fixed to the frame body 2 below the guide shaft 20 and on a left side of the inner wall 71. The partition plate 28 extends along the front-rear direction and the left-right direction. A right end portion of the partition plate 28 is connected to a lower end portion of the inner wall 71.

As shown in FIGS. 3 and 4, the partition plate 29 is fixed to the frame body 2 below the guide shaft 20 and on a right side of the inner wall 72. The partition plate 29 extends along the front-rear direction and the left-right direction. A left end portion of the partition plate 29 is connected to a lower end portion of the inner wall 72.

As shown in FIG. 4, a supply port 75, which has a circular shape in plan view and penetrates the partition plate 28 in the up-down direction, is formed in a right front portion of the partition plate 28. A supply port 76, which has a circular shape in a plan view and penetrates the partition plate 29 in the up-down direction, is formed in a left front portion of the partition plate 29. A positional relationship between the supply port 75 and the supply port 76 is not particularly limited, and, in the present embodiment, the supply port 75 is formed in front of the supply port 76 in the front-rear direction. Pipes that is not shown are connected to the supply ports 75 and 76 and to the humidified air supply pipes 81 and 82 to be described later.

As shown in FIG. 2, the carriage 6 is supported by the front shaft 21 and the rear shaft 22 to be movable in the main scanning direction. The carriage 6 has a plate shape and extends in the front-rear and left-right directions. The carriage 6 extends from the front shaft 21 to the rear shaft 22.

Figure 5:
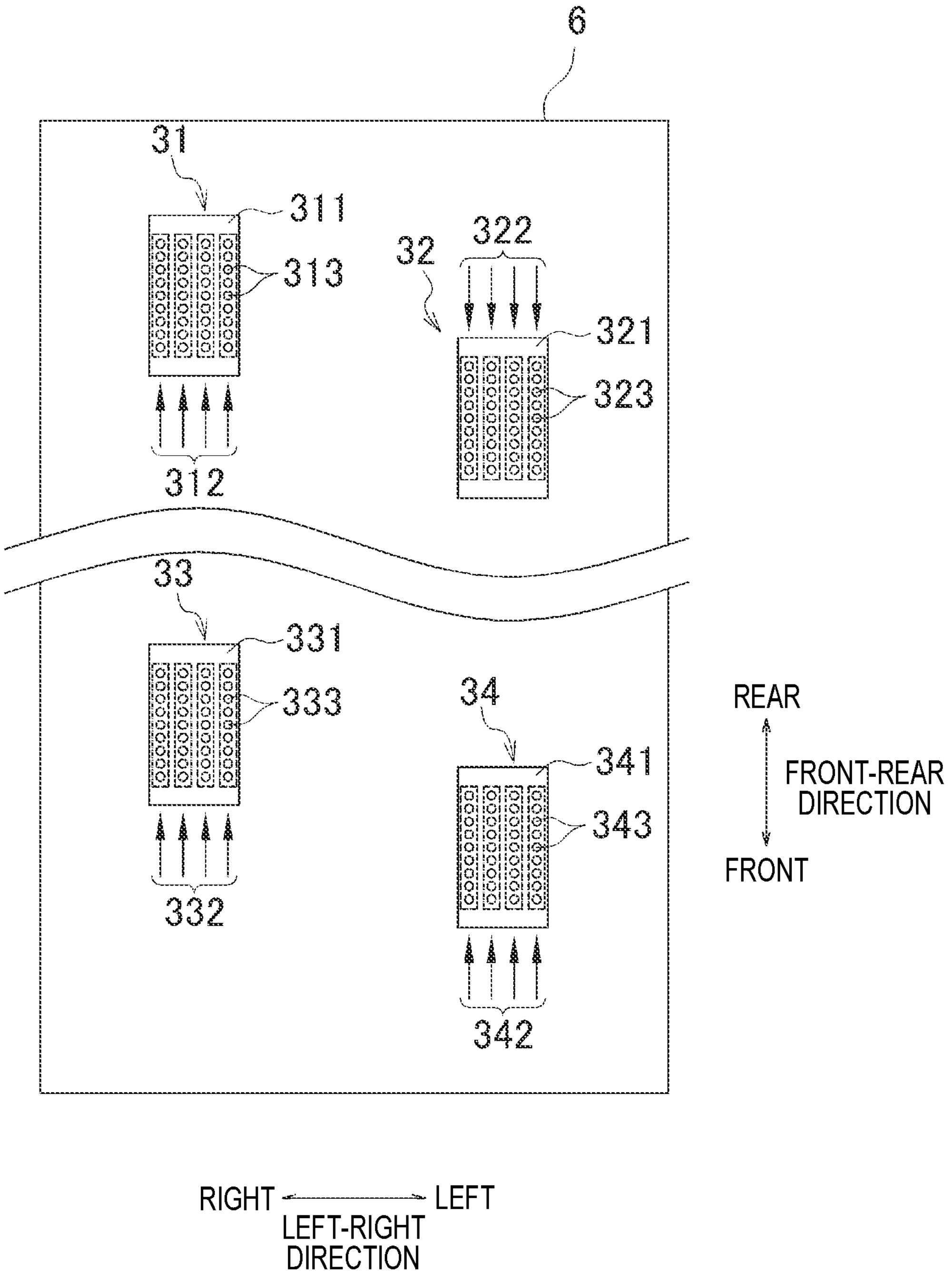
FIG. 5 is a schematic view of a carriage as viewed from below.

As shown in FIGS. 2 and 5, the carriage 6 is provided with the white heads 31 and 32 and the color heads 33 and 34. The white heads 31 and 32 and the color heads 33 and 34 configure a "head" of the present disclosure.

The white heads 31 and 32 and the color heads 33 and 34 have the same structure, and have a rectangular parallelepiped shape in the present embodiment. Hereinafter, when the white heads 31 and 32 and the color heads 33 and 34 are collectively referred to, or when any one of them is not specified, the white heads 31 and 32 and the color heads 33 and 34 are referred to as the "heads 30". As shown in FIG. 5, the white heads 31 and 32 are located at a rear portion of the carriage 6. The white head 31 is located at a right rear portion of the carriage 6. The white head 32 is located on a left side of the white head 31, and is shifted to a front side with respect to the white head 31. A rear portion of the white head 32 overlaps a front portion of the white head 31 in the left-right direction.

As shown in FIGS. 2 and 5, the color heads 33 and 34 are located on a front side of the white heads 31 and 32. The color heads 33 and 34 are located at the same positions as the white heads 31 and 32, respectively, in the left-right direction. That is, the white heads 31 and 32 and the color heads 33 and 34 are arranged side by side along the sub-scanning direction. The color head 34 is located on a left side of the color head 33 and is shifted to a front side with respect to the color head 33. A rear portion of the color head 34 overlaps a front portion of the color head 33 in the left-right direction.

As shown in FIG. 5, a nozzle surface 311 is provided on a lower surface of the white head 31. The nozzle surface 311 extends in the front-rear and left-right directions. A plurality of nozzle rows 312 are formed on the nozzle surface 311. The plurality of nozzle rows 312 are arranged in the left-right direction. Each of the nozzle rows 312 includes a plurality of nozzles 313 arranged in a row at equal intervals in the front-rear direction. The plurality of nozzles 313 are openings and configured to eject the white ink downward.

Similarly to a configuration of the white head 31, nozzle surfaces 321, 331, and 341 are provided on lower surfaces of the white head 32 and the color heads 33 and 34, respectively. The nozzle surfaces 321, 331, and 341 extend in the front-rear and left-right directions. A plurality of nozzle rows 322, 332, and 342 are formed on the nozzle surfaces 321, 331, and 341, respectively. The plurality of nozzle rows 322, 332, and 342 are arranged in the left-right direction. The plurality of nozzle rows 322, 332, and 342, respectively, include a plurality of nozzles 323, 333, and 343. The respective plurality of nozzles 323, 333, and 343 are arranged in a row at equal intervals in the front-rear direction.

The plurality of nozzles 323 is configured to eject the white ink downward. The respective color inks of different colors correspond to the plurality of nozzle rows 332. That is, the plurality of nozzles 333 is configured to eject the respective inks of the colors corresponding to the plurality of nozzle rows 332 downward. The respective color inks of different colors correspond to the plurality of nozzle rows 342. The plurality of nozzles 343 is configured to eject the respective inks of the colors corresponding to the plurality of nozzle rows 342 downward.

As shown in FIGS. 2 and 5, a separation distance between the white head 31 and the color head 33 in the sub-scanning direction is larger than a separation distance between the two white heads 31 and 32 in the main scanning direction. A separation distance between the white head 32 and the color head 34 in the sub-scanning direction is larger than the separation distance between the two white heads 31 and 32 in the main scanning direction.

The moving mechanism 77 includes a driving belt 98 and a main scanning motor 99. The driving belt 98 is connected to a rear end portion of the carriage 6. The driving belt 98 is provided on the rear shaft 22 and extends in the left-right direction. A left end portion of the driving belt 98 is connected to the main scanning motor 99. In a case where the main scanning motor 99 is driven, the driving belt 98 moves the carriage 6 in the left-right direction along the front shaft 21 and the rear shaft 22. That is, the moving mechanism 77 moves the carriage 6 on which the head 30 is mounted in the main scanning direction. FIGS. 2 and 3 show a state in which the carriage 6 is located at a right end of a movement range R.

In FIGS. 2 and 3, the movement range R of the head 30 is indicated as a center of the carriage 6 in the left-right direction. As shown in FIG. 3, the head 30 is mainly disposed, by the moving mechanism 77, at one of three positions that are a maintenance position B1, an ejection position B2, and a head standby position B3. The maintenance position B1 is located at a left end portion of the movement range R of the head 30, and is a position where a maintenance is performed on the head 30 by a maintenance unit such as a wiper or a cap (not shown). The printing device 1 is configured to move the head 30 to the maintenance position B1 in a case where printing is not performed, and is configured to perform maintenance by the maintenance unit. The ejection position B2 is a position between the maintenance position B1 and the head standby position B3 and above the platen 12 disposed at the printing position P3 in the main scanning direction. In a state in which the head 30 is disposed at the ejection position B2, the head 30 ejects the ink in accordance with the print data, and the printing is performed on the printing medium on the platen 12 disposed at the printing position P3. The head standby position B3 is located at a right end of the movement range R of the head 30, and is a position at which the head 30 is disposed in a case where the operator performs the operation such as cleaning the head 30. For example, the printing device 1 is configured to move the head 30 to the head standby position B3 and is configured to cause the head 30 to stand by based on an instruction input from the operation portions 15 by the operation of the user.

In the printing device 1, the platen 12 is moved in the sub-scanning direction by the driving of the sub-scanning motor 26 at the printing position P3, and the carriage 6 is moved in the main scanning direction by the driving of the main scanning motor 99 at the ejection position B2, whereby the printing medium is moved relative to the head 30 in the sub-scanning direction and the main scanning direction.

An action of moving the head 30 in the main scanning direction and ejecting the ink onto the printing medium in a case where the head 30 faces the printing medium, is referred to as "ejection scanning". The printing device 1 is configured to repeat the ejection scanning and the movement of the platen 12 in the sub-scanning direction to perform the printing on the printing medium. For example, the printing device 1 is configured to eject the white ink from the white heads 31 and 32 in the ejection scanning to form the base on the printing medium. The printing device 1 is configured to eject the color inks from the color heads 33 and 34 to print the color image onto the base formed on the printing medium, in the ejection scanning.

As shown in FIG. 3, the suction mechanisms 73 and 74 is configured to suction humidified air, which will be described later. In the main scanning direction, the suction mechanism 73 is provided on a left side of the conveyance mechanism 14 inside the housing 8 (see FIG. 1), and the suction mechanism 74 is provided on a right side of the conveyance mechanism 14 inside the housing 8. Since the suction mechanisms 73 and 74 have configurations bilaterally symmetrical to each other, the configuration of the suction mechanism 73 will be described below, and a description of the suction mechanism 74 will be omitted.

Figure 6A:
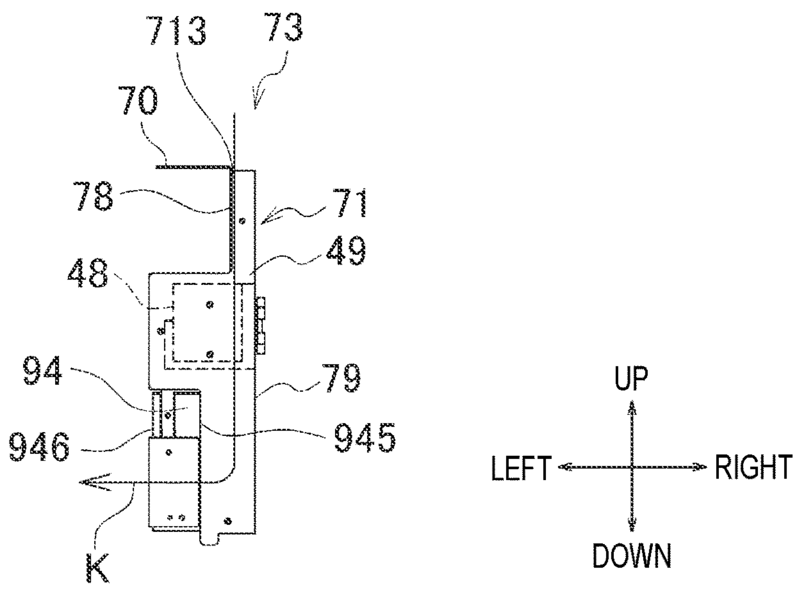
FIG. 6A is a front view of a suction mechanism.
Figure 6B:
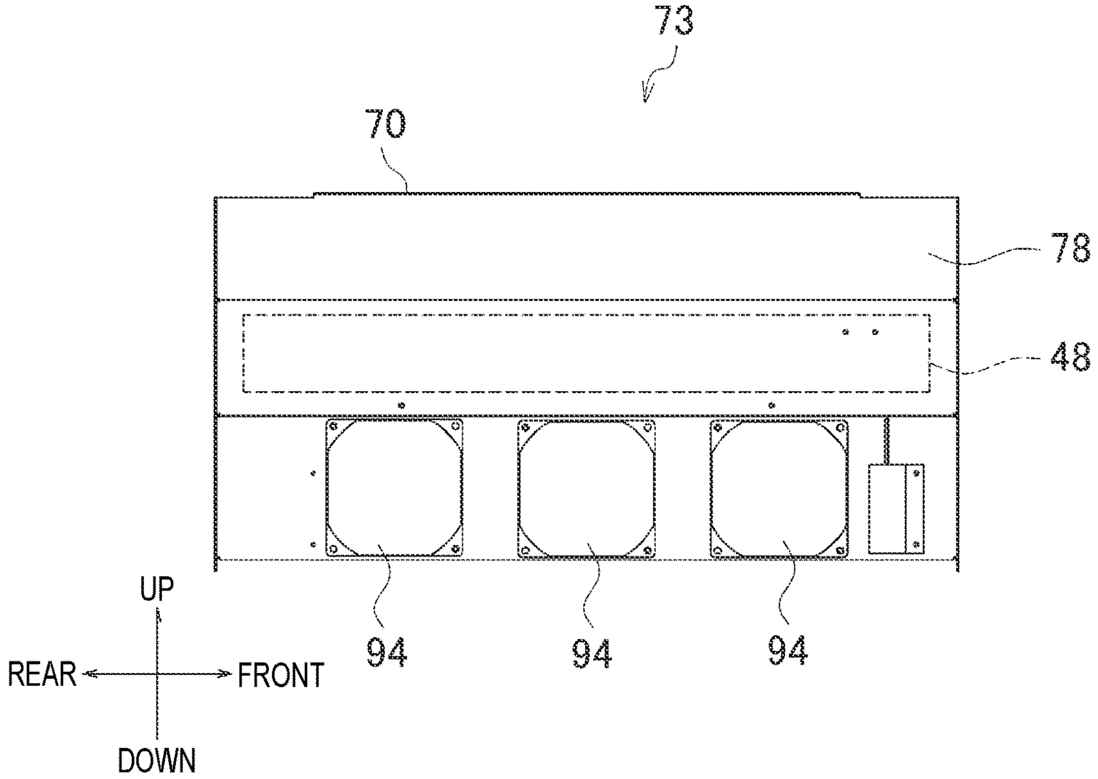
FIG. 6B is a side view of the suction mechanism.

As shown in FIGS. 6A and 6B, the suction mechanism 73 includes the inner wall 71, three fans 94, and a filter unit 48. A right surface 79 of the inner wall 71 extends in the up-down direction and the front-rear direction. A slit-shaped suction port 713 elongated in the front-rear direction is formed in an upper surface of the inner wall 71.

As shown in FIG. 6A, the inner wall 71 includes a fixing plate 70 and an accommodating portion 49. The fixing plate 70 is a plate-shaped portion extending in the left-right direction at an upper end of the inner wall 71. As shown in FIG. 4, the fixing plate 70 is fixed to the shaft 57 extending in the front-rear direction. The accommodating portion 49 has a box shape, and detachably accommodates, inside the inner wall 71, the filter unit 48 having a rectangular parallelepiped shape elongated in the front-rear direction. The filter unit 48 includes a filter and a support body configured to support the filter. The filter is, for example, a resin filter in which a plurality of minute holes are formed, and is configured to adsorb and collect a foreign matter such as mist and dust in air.

As shown in FIG. 6B, the three fans 94 are provided at a lower portion of a left surface 78 of the inner wall 71. The three fans 94 are disposed at substantially equal intervals in the front-rear direction, and have the following configuration. As shown in FIG. 6A, a suction port 945 of the fan 94 is located on a right side of the fan 94, and an exhaust port 946 of the fan 94 is located on a left side of the fan 94. That is, the suction port 945 is located on a side of the platen 12 disposed at the printing position P3 with respect to the fan 94, and the exhaust port 946 is located on a left surface side of the housing 8 with respect to the fan 94. The suction port 945 of the fan 94 is connected to a lower portion of the left surface 78 of the inner wall 71.

The suction port 713 is disposed above the suction port 945 of the fan 94. As shown in FIG. 4, in a case where each fan 94 is driven in the suction mechanism 73, the air suctioned into the inner wall 71 from the suction port 713 of the inner wall 71 passes through the filter of the filter unit 48, and the air from which the foreign matter is collected is discharged from a space inside the inner wall 71 from the suction port 945 of the fan 94 via the exhaust port 946. That is, in a case where the fan 94 is driven, as shown in FIG. 6A, the air flows in a space surrounded by the right surface 79 and the left surface 78 of the inner wall 71, as indicated by an arrow K.

As shown in FIG. 4, the suction mechanism 74 includes the inner wall 72, three fans (not shown), and a filter unit (not shown) respectively corresponding to the inner wall 71, the three fans 94, and the filter unit 48 of the suction mechanism 73. A slit-shaped suction port 723 elongated in the front-rear direction and corresponding to the suction port 713 is formed on an upper surface of the suction mechanism 74. In a case where each fan of the suction mechanism 74 is driven, the air flows from the suction port 723 to a space inside the inner wall 72. Thereafter, the air passes through the filter of the filter unit in a case where the air flows from an upper side to a lower side of the space. Further, the air flows from a lower portion of the space to a right side where the fan is provided, and is discharged from the space.

The suction mechanisms 73 and 74 may include the inner walls 71 and 72, and the fans 94, respectively, and the filter unit 48 may not be provided.

The humidifier 86 ("humidified air generator" of the present disclosure) shown in FIG. 3 supplies the humidified air to the supply port 75 disposed on the left side of the suction mechanism 73 and the supply port 76 disposed on a right side of the suction mechanism 74. The humidifier 86 is provided inside the housing 8 and below the partition plate 29. The humidifier 86 includes a reservoir (not shown), a humidification driver 861 (see FIG. 9), a suction port 89 (see FIG. 3) configure to take the air into the humidifier 86, tubes 87 and 88 (see FIG. 3), and fans 862 and 863 (see FIG. 9). The reservoir stores a liquid (for example, water) used for humidification. A water supply pipe may be connected to the reservoir, and, for example, water may be supplied to the reservoir from a water tap or an external device such as a water supply tank that is not shown.

The humidification driver 861 humidifies the air taken into the humidifier 86 through the suction port 89 by using the liquid stored in the reservoir. The humidification driver 861 may humidify the air by any method such as a vapor method, a vaporization method, an ultrasonic method, and an electrolysis method. One end of the tube 87 is connected to the humidifier 86, and the other end of the tube 87 is connected to the supply port 75. The supply port 75 is located below the head 30 disposed on a left end side (maintenance position B1) of the movement range R. One end of the tube 88 is connected to the humidifier 86, and the other end of the tube 88 is connected to the supply port 76. The supply port 76 is located below the head 30 disposed on a right end side (head standby position B3) of the movement range R.

The fan 862 supplies the air humidified by the humidification driver 861 to the supply port 75 via the tube 87 shown in FIG. 3. The fan 863 supplies the air humidified by the humidification driver 861 to the supply port 76 via the tube 88 shown in FIG. 3. The humidified air supplied to the supply port 75 is sent to a support surface 12*a* side of the platen 12 via the humidified air supply pipe 81 to be described later. The humidified air supplied to the supply port 76 is sent to a support surface 12*a* side of the platen 12 via the humidified air supply pipe 82 to be described later. That is, the humidified air supplied from the humidifier 86 is sent toward the printing medium supported by the platen 12.

As shown in FIG. 4, the humidified air supply pipe 81 is supported by a support frame 811. The support frame 811 is fixed to the frame body 2 in a state in which the support frame 811 is disposed in front of the platen 12 disposed at the printing position P3 or in front of a part of the platen 12 in a case where the part of the platen 12 is at the printing position P3, in the front-rear direction. The humidified air supply pipe 81 is fixed to a center of the support frame 811 in the left-right direction. The humidified air supply pipe 81 includes two flow paths 81*a* and 81*b* arranged side by side in the left-right direction. The left flow path 81*a* extends leftward from the front toward the rear. The flow path 81*b* on the right side extends to the right side from the front side toward the rear side. The two flow paths 81*a* and 81*b* merge at a front end portion. Further, a front end of a merging portion of the flow paths 81*a* and 81*b* and the supply port 75 are connected by a pipe that is not shown. Humidified air supply ports 81*a*1 and 81*b*1 configured to supply the humidified air are formed at rear ends of the flow paths 81*a* and 81*b*, respectively.

As shown in FIG. 4, the humidified air supply pipe 82 is supported by a support frame 821. The support frame 821 is fixed to the frame body 2 in a state in which the support frame 821 is disposed behind the platen 12 disposed at the printing position P3 or is disposed behind the part of the platen 12 in a case where the part of the platen 12 is at the printing position P3, in the front-rear direction. The humidified air supply pipe 82 is fixed to a center of the support frame 821 in the left-right direction. As shown in FIG. 4, the humidified air supply pipe 82 has the same configuration as that of the humidified air supply pipe 81, and includes two flow paths 82*a* and 82*b* arranged side by side in the left-right direction. The left flow path 82*a* extends leftward from the rear toward the front. The right flow path 82*b* extends rightward from the rear toward the front. The two flow paths 82*a* and 82*b* merge at a rear end portion. Further, a rear end of a merging portion of the flow paths 82*a* and 82*b* and the supply port 76 are connected by a pipe that is not shown. Humidified air supply ports 82*a*1 and 82*b*1 configured to supply the humidified air are formed at front ends of the flow paths 82*a* and 82*b*, respectively.

The support frames 811 and 821 may include hollow tubes, and the hollow tubes may be connected to the humidified air supply pipes 81 and 82, respectively. Accordingly, the humidified air supplied to the support frames 811 and 821 can be supplied from the humidified air supply ports 81*a*1, 81*b*1, 82*a*1, and 82*b*1 of the humidified air supply pipes 81 and 82. In this case, the support frames 811 and 821 and the supply ports 75 and 76 or the humidifier 86 may be connected by pipes that are not shown, and the humidified air may be supplied to the support frames 811 and 821.

Figure 7:
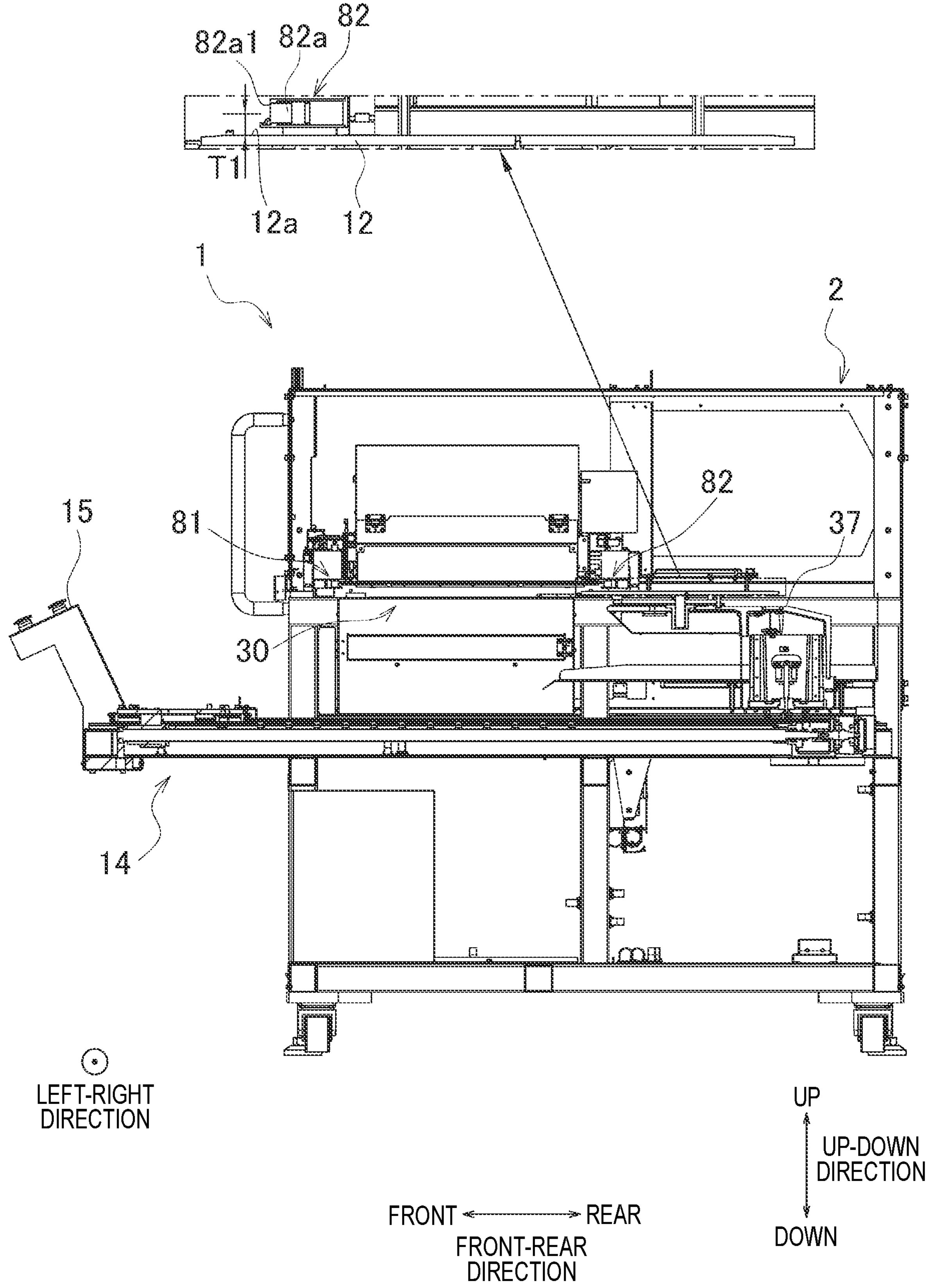
FIG. 7 is a cross-sectional view taken along a line VII-VII shown in FIG. 3.
Figure 8:
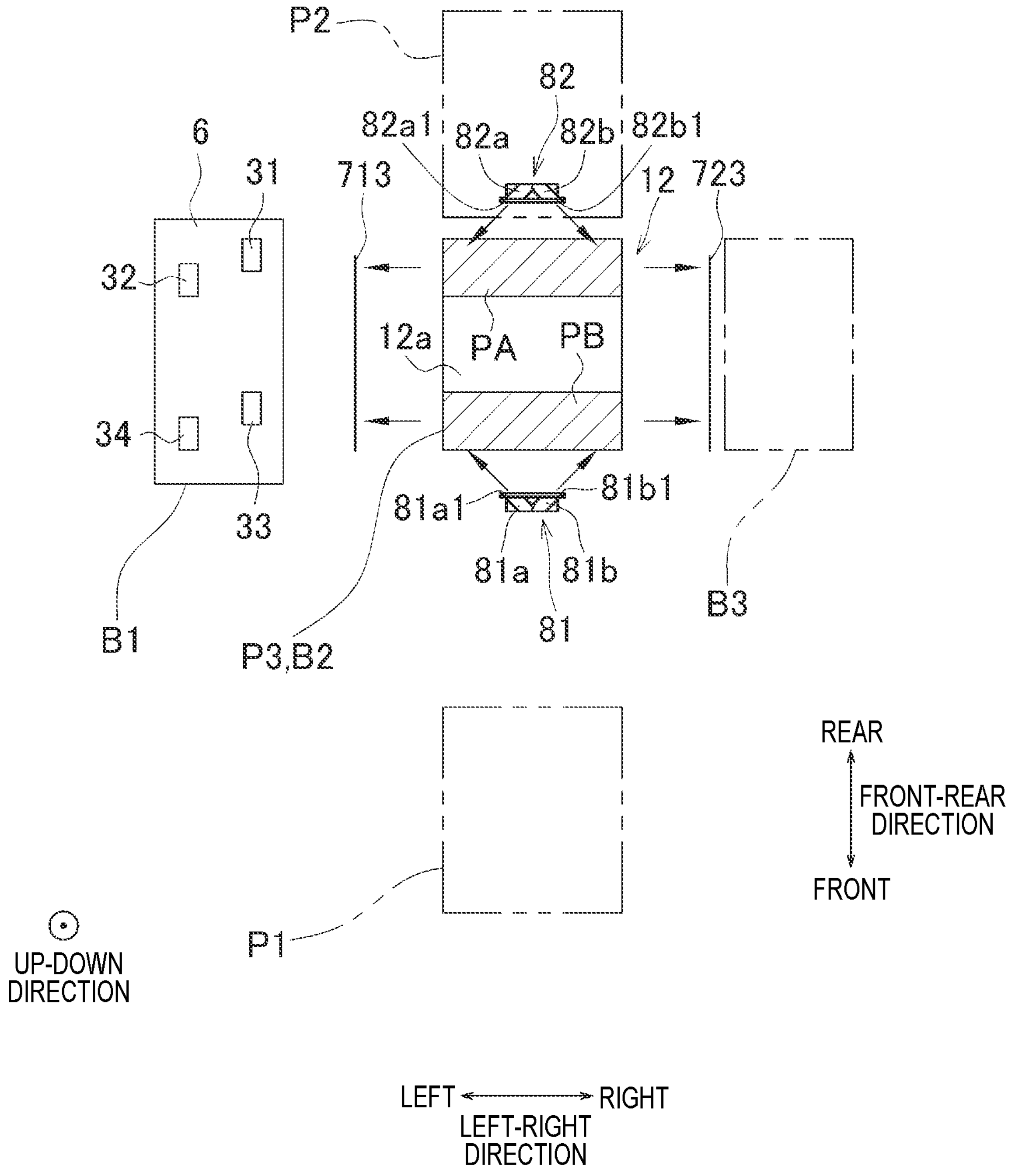
FIG. 8 is a view showing a situation when humidified air is supplied from humidified air supply ports of the printing device shown in FIG. 1.

These four humidified air supply ports 81*a*1, 81*b*1, 82*a*1, and 82*b*1 are provided around the platen 12 disposed at the printing position P3 shown in FIGS. 4 and 8, and face the support surface 12*a* side of the platen 12. The two humidified air supply ports 81*a*1 and 81*b*1 face rearward, and the two humidified air supply ports 82*a*1 and 82*b*1 face forward. The humidified air supply ports 81*a*1, 81*b*1, 82*a*1, and 82*b*1 are disposed between the pair of inner walls 71 and 72, in the left-right direction. The humidified air supply ports 81*a*1, 81*b*1, 82*a*1, and 82*b*1 are disposed at positions where left and right end portions of the platen 12, which is disposed at the printing position P3, are disposed between the humidified air supply ports 81*a*1, 81*b*1, 82*a*1, and 82*b*1 and the suction ports 713 and 723, in the left-right direction. For example, the four humidified air supply ports 81*a*1, 81*b*1, 82*a*1, and 82*b*1 are disposed in a pair at positions corresponding to central portions of a front side and a rear side facing each other of the support surface 12*a* of the platen 12 disposed at the printing position P3. As shown in FIG. 7, the four humidified air supply ports 81*a*1, 81*b*1, 82*a*1, and 82*b*1 are disposed above the platen 12 such that a distance from central axes, which passes through centers of openings, of the humidified air supply ports 81*a*1, 81*b*1, 82*a*1, and 82*b*1 to the support surface 12*a* of the platen 12 becomes a predetermined distance T1 in the up-down direction. Further, the four humidified air supply ports 81*a*1, 81*b*1, 82*a*1, and 82*b*1 are opened toward a space area, which is an area between the head 30 and the support surface 12*a* in the up-down direction, on the support surface 12*a* of the platen 12 disposed at the printing position P3.

As shown in FIG. 8, the humidified air supplied from the four humidified air supply ports 81*a*1, 81*b*1, 82*a*1, and 82*b*1 is supplied from central portions, in plan view, of the front side and the rear side of the platen 12 disposed at the printing position P3 toward a left side and a right side of the platen 12. Accordingly, in a space area between the platen 12 and the head 30 in a vertical direction, a large amount of humidified air is supplied to a rear area PA, which indicated by hatching in FIG. 8, in which the conveyance path of the platen 12 in the front-rear direction and the movement paths of the two white heads 31 and 32 in the main scanning direction overlap in the up-down direction, and a front area PB, which indicated by hatching in FIG. 8, in which the conveyance path of the platen 12 in the front-rear direction and the movement paths of the two color heads 33 and 34 in the main scanning direction overlap in the up-down direction. At this time, in a case where the suction mechanisms 73 and 74 are driven, the humidified air supplied to the rear area PA and the front area PB flows outward along the left-right direction, and is easily suctioned from the suction ports 713 and 723.

An electrical configuration of the printing device 1 will be described with reference to FIG. 9. The printing device 1 includes the controller 80. The controller 80 includes a CPU 80*a*, a ROM 80*b*, a RAM 80*c*, and a flash memory 80*d*. The CPU 80*a* controls the printing device 1 and is electrically connected to the ROM 80*b*, the RAM 80*c*, and the flash memory 80*d*. The ROM 80*b* is configured to store a control program for the CPU 80*a* to control operation of the printing device 1, information required by the CPU 80*a* in a case where various programs are executed, and the like. The ROM 80*b* is configured to store a position of the carriage 6 (head 30) based on a rotation angle of the main scanning motor 99, for example, and is configured to store the position of the platen 12 based on a rotation angle of the sub-scanning motor 26. The RAM 80*c* temporarily stores various data and the like used in the control program. The flash memory 80*d* is nonvolatile and is configured to store the print data and the like for printing.

Figure 9:
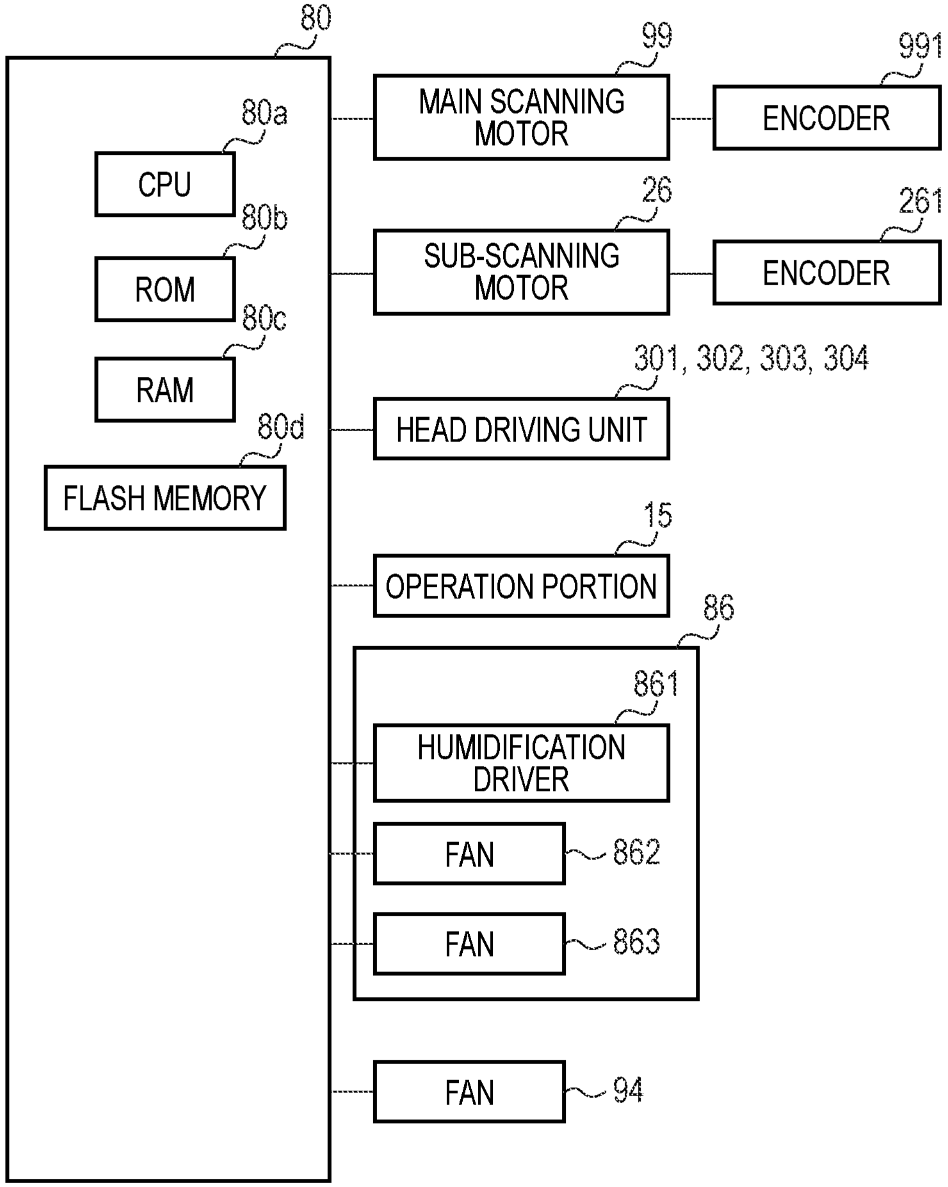
FIG. 9 is a block diagram showing an electrical configuration of the printing device shown in FIG. 1.

As shown in FIG. 9, the main scanning motor 99, the sub-scanning motor 26, four head driving units 301 to 304, the humidifier 86, the fans 94, and the operation portions 15 are electrically connected to the controller 80. The main scanning motor 99, the sub-scanning motor 26, the head driving units 301 to 304, the humidifier 86, and the fans 94 are driven under control of the controller 80.

The main scanning motor 99 and the sub-scanning motor 26 are provided with encoders 991 and 261, respectively. The encoder 991 is configured to detect the rotation angle of the main scanning motor 99 and is configured to output a detection result to the controller 80. The encoder 261 is configured to detect the rotation angle of the sub-scanning motor 26 and is configured to output a detection result to the controller 80.

The four head driving units 301 to 304 correspond to the white heads 31 and 32 and the color heads 33 and 34 in this order, and are provided in the heads 31 to 34. Each of the head driving units 301 to 304 includes a plurality of driving elements, which are piezoelectric elements or heating elements, configured to selectively apply energy to the inks in a plurality of individual flow paths communicating with the respective plurality of nozzles of the head 30. The head driving units 301 to 304 is configured to drive to apply energy to the inks in the white heads 31 and 32 and the color heads 33 and 34, and is configured to selectively eject the ink from the corresponding nozzles 313, 323, 333, and 343.

<Control During Printing>

Figure 10:
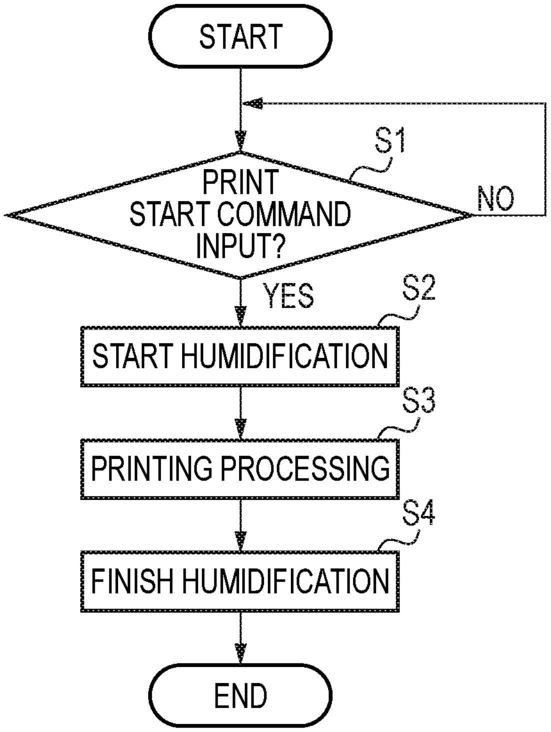
FIG. 10 is a flowchart showing an example of a processing procedure executed when a print start command is input to the printing device shown in FIG. 1.

Control performed by the controller 80 in a case where an image is printed on the printing medium will be described with reference to FIG. 10. In a case where the operation portions 15 are operated by the user and the print start command is input to the printing device 1, the controller 80 is configured to read the control program from the ROM 80*b* and to operate to perform a flow shown in FIG. 10. Hereinafter, the flow in FIG. 10 will be described.

First, the controller 80 is configured to determine whether the print start command is input (step S1). The user applies the pretreatment liquid to the printing medium before operating the operation portions 15 and inputting the print start command. The pretreatment liquid may be applied from an application mechanism such as a spray or a head provided separately from the printing device 1 in a case where the print start command is input. Further, the printing medium (T-shirt) is disposed on the support surface 12*a* of the platen 12 before volatilization of the volatile component of the pretreatment liquid applied to the printing medium is completed. That is, the printing medium to which the pretreatment liquid has been applied can be immediately placed on the platen 12 without performing a special treatment such as drying. In the present embodiment, in a case where step S1 is processed, the printing medium immediately after the pretreatment liquid is applied is supported by the platen 12. Therefore, during a printing process to be described later, the organic acid volatilizes from the pretreatment liquid applied to the printing medium. The platen 12 is disposed at the support position P1 in a case where the printing is not performed. In the printing device 1, in a case where the printing is not performed, the head 30 is normally disposed at the maintenance position B1, and capping is performed in which the plurality of nozzles of the head 30 are covered with a cap of the maintenance unit that is not shown.

In a case where the print start command is not input (step S1: NO), step S1 is repeated until the print start command is input. On the other hand, in a case where the print start command is input (step S1: YES), the controller 80 is configured to control the humidifier 86 such that supply of the humidified air from the four humidified air supply ports 81*a*1, 81*b*1, 82*a*1, and 82*b*1 is started (step S2). That is, the controller 80 is configured to drive the humidification driver 861 to generate the humidified air. Further, the controller 80 is configured to drive the fans 862 and 863 to supply the humidified air from the four humidified air supply ports 81*a*1, 81*b*1, 82*a*1, and 82*b*1. By supplying the humidified air from the four humidified air supply ports 81*a*1, 81*b*1, 82*a*1, and 82*b*1, the humidified air is supplied to the space area including the rear area PA and the front area PB as shown in FIG. 8. At this time, the controller 80 is configured to drive the fans 94 of the suction mechanisms 73 and 74. In this way, a flow of the humidified air flowing from the humidified air supply ports 81*a*1, 81*b*1, 82*a*1, and 82*b*1 to the suction ports 713 and 723 via the rear area PA and the front area PB, is formed.

Next, the controller 80 is configured to perform the printing process (step S3). The controller 80 is configured to control the sub-scanning motor 26 based on the detection result from the encoder 261 to move the platen 12 from the support position P1 to the pre-printing standby position P2. Thereafter, the controller 80 is configured to control the sub-scanning motor 26 based on the detection result from the encoder 261 to move the platen 12 from the pre-printing standby position P2 to the printing position P3. At this time, the controller 80 is configured to perform uncapping to separate the cap from the head 30.

Further, the controller 80 is configured to control the main scanning motor 99 based on the detection result from the encoder 991 to move the carriage 6 from the maintenance position B1 to the ejection position B2 and to cause the head 30 to face the printing medium disposed on the platen 12.

In a state in which the platen 12 is located at the printing position P3 and the carriage 6 is located at the ejection position B2, the controller 80 is configured to control the head driving units 301 to 304, the main scanning motor 99, and the sub-scanning motor 26, and is configured to alternately repeat the ejection scanning and the movement of the platen 12 to the front to perform the printing on the printing medium. That is, at the time of printing on the printing medium, the platen 12 is conveyed forward from the pre-printing standby position P2 to the printing position P3, and thus the inks are ejected from the nozzles of the white heads 31 and 32 onto the printing medium to which the pretreatment agent is applied to form the base. Further, the inks are ejected from the nozzles of the color heads 33 and 34 onto the base formed on the printing medium by the white heads 31 and 32, to form the image. A white portion of the image is a base portion formed with the white ink. Therefore, the color ink is not ejected onto the base portion.

Since the humidified air is supplied from the four humidified air supply ports 81*a*1, 81*b*1, 82*a*1, and 82*b*1 before the printing process is performed, in a case where the printing on the printing medium is performed, the humidified air has been supplied to the printing medium. That is, a humidified air layer is present on the printing medium. Therefore, the volatile component of the pretreatment liquid applied to the printing medium is less likely to volatilize. Even in a case where the volatile component of the pretreatment liquid volatilizes, the volatile component is less likely to reach an inside of the nozzle of the head 30 facing the printing medium. In a case where the printing on the printing medium based on the print data is finished in a state in which such a humidified air layer is present on the printing medium, the controller 80 is configured to control the humidifier 86 to stop the supply of the humidified air from the four humidified air supply ports 81*a*1, 81*b*1, 82*a*1, and 82*b*1 (step S4). At this time, the controller 80 is configured to stop driving the fans 94 of the suction mechanisms 73 and 74. This stops the flow of the humidified air flowing from the humidified air supply ports 81*a*1, 81*b*1, 82*a*1, and 82*b*1 to the rear area PA and the front area PB, and from the rear area PA and the front area PB to the suction ports 713 and 723.

The controller 80 is configured to control the sub-scanning motor 26 based on the detection result from the encoder 261 to stop the platen 12 at the support position P1. The user removes the printing medium on which the image is formed from the platen 12 disposed at the support position P1. At this time, the controller 80 is configured to control the main scanning motor 99 based on the detection result from the encoder 991 to move the carriage 6 leftward from the ejection position B2 and stop the carriage 6 at the maintenance position B1. Further, the controller 80 is configured to perform capping of the head 30 with the cap of the maintenance unit. In this way, the flow in FIG. 10 ends.

As described above, according to the printing device 1 of the present embodiment, the humidified air supply ports 81*a*1, 81*b*1, 82*a*1, and 82*b*1 are provided around the platen 12 disposed at the printing position P3, and the humidified air can be supplied from the humidified air supply ports 81*a*1, 81*b*1, 82*a*1, and 82*b*1 to the support surface 12*a* of the platen 12. Therefore, in a case where the printing is performed by ejecting the ink from the nozzle of the head 30 onto the printing medium to which the pretreatment agent is applied, it is possible to supply the humidified air onto the printing medium, and at the printing position P3, the volatile component of the pretreatment liquid applied to the printing medium is less likely to volatilize, and the volatile component itself of the pretreatment liquid is less likely to reach the nozzle. Therefore, it is possible to reduce an occurrence of a problem due to a reaction between the ink in the nozzle and the volatile component of the pretreatment liquid. As described above, it is possible to reduce the occurrence of the problem due to the reaction between the ink in the nozzle and the volatile component of the pretreatment liquid, and thus it is possible to use the pretreatment liquid containing the organic acid as the volatile component. It is possible to prevent volatilization of the organic acid of the pretreatment liquid applied to the printing medium.

The humidified air supply ports 81*a*1, 81*b*1, 82*a*1, and 82*b*1 are disposed between the pair of inner walls 71 and 72 in the left-right direction. Accordingly, the humidified air can be effectively supplied from the humidified air supply ports 81*a*1, 81*b*1, 82*a*1, and 82*b*1 to the support surface 12*a* of the platen 12 disposed at the printing position P3.

The humidified air supply ports 81*a*1, 81*b*1, 82*a*1, and 82*b*1 are disposed at positions where the left and right end portions of the platen 12, which is disposed at the printing position P3, are disposed between the humidified air supply ports 81*a*1, 81*b*1, 82*a*1, and 82*b*1 and the suction ports 713 and 723, in the left-right direction. Accordingly, the humidified air supplied from the humidified air supply ports 81*a*1, 81*b*1, 82*a*1, and 82*b*1 is suctioned into the suction ports 713 and 723 through the platen 12. Therefore, at the printing position P3, the volatile component of the pretreatment liquid applied to the printing medium is less likely to volatilize, and the volatile component itself of the pretreatment liquid is less likely to reach the nozzle.

The humidified air supply ports 81*a*1, 81*b*1, 82*a*1, and 82*b*1 face the support surface 12*a* side of the platen 12 disposed at the printing position P3. Accordingly, the humidified air can be supplied toward the support surface 12*a* side. Therefore, at the printing position P3, the volatile component of the pretreatment liquid applied to the printing medium is less likely to volatilize, and the volatile component itself of the pretreatment liquid is less likely to reach the nozzle.

The four humidified air supply ports 81*a*1, 81*b*1, 82*a*1, and 82*b*1 are disposed in a pair at the positions corresponding to the respective central portions of the front side and the rear side facing each other of the support surface 12*a* of the platen 12 disposed at the printing position P3, in plan view. Accordingly, the humidified air can be effectively supplied to the support surface 12*a* of the platen 12. Therefore, at the printing position P3, the volatile component of the pretreatment liquid applied to the printing medium is less likely to volatilize, and the volatile component itself of the pretreatment liquid is less likely to reach the nozzle.

As a modification, two or six or more humidified air supply ports may be provided, and one or three or more humidified air supply ports may be disposed at each of positions corresponding to respective central portions of a front side and a rear side facing each other of the support surface 12*a* of the platen 12 disposed at the printing position P3, in plan view. The humidified air supply ports may be disposed at positions corresponding to respective central portions of a left side and a right side facing each other of the support surface 12*a* of the platen 12 disposed at the printing position P3, in plan view.

The controller 80 is configured to control the humidifier 86 to generate humidified air and to supply the humidified air from the humidified air supply ports 81*a*1, 81*b*1, 82*a*1, and 82*b*1 during a period from input of a print start command to an end of printing on a printing medium based on print data. Accordingly, the humidified air is supplied to the printing medium before ink is ejected from a nozzle toward the printing medium. Therefore, at the time when the ink is ejected, a volatile component of a pretreatment liquid is less likely to volatilize, and the volatile component itself of the pretreatment liquid is less likely to reach the nozzle. Even in a case where the platen 12 is disposed at the printing position P3, since the humidified air is continuously supplied, the volatile component of the pretreatment liquid is further less likely to volatilize in a state in which the printing medium and the nozzle face each other.

In the above-described embodiment, the four humidified air supply ports 81*a*1, 81*b*1, 82*a*1, and 82*b*1 are disposed in a pair at the positions corresponding to the respective central portions of the front side and the rear side facing each other of the support surface 12*a* of the platen 12 disposed at the printing position P3, in plan view, but the humidified air supply ports may be disposed at positions corresponding to respective four corner portions of the support surface 12*a*. The same components as those of the above-described embodiment are denoted by the same reference numerals, and a description of will be omitted.

Figure 11:
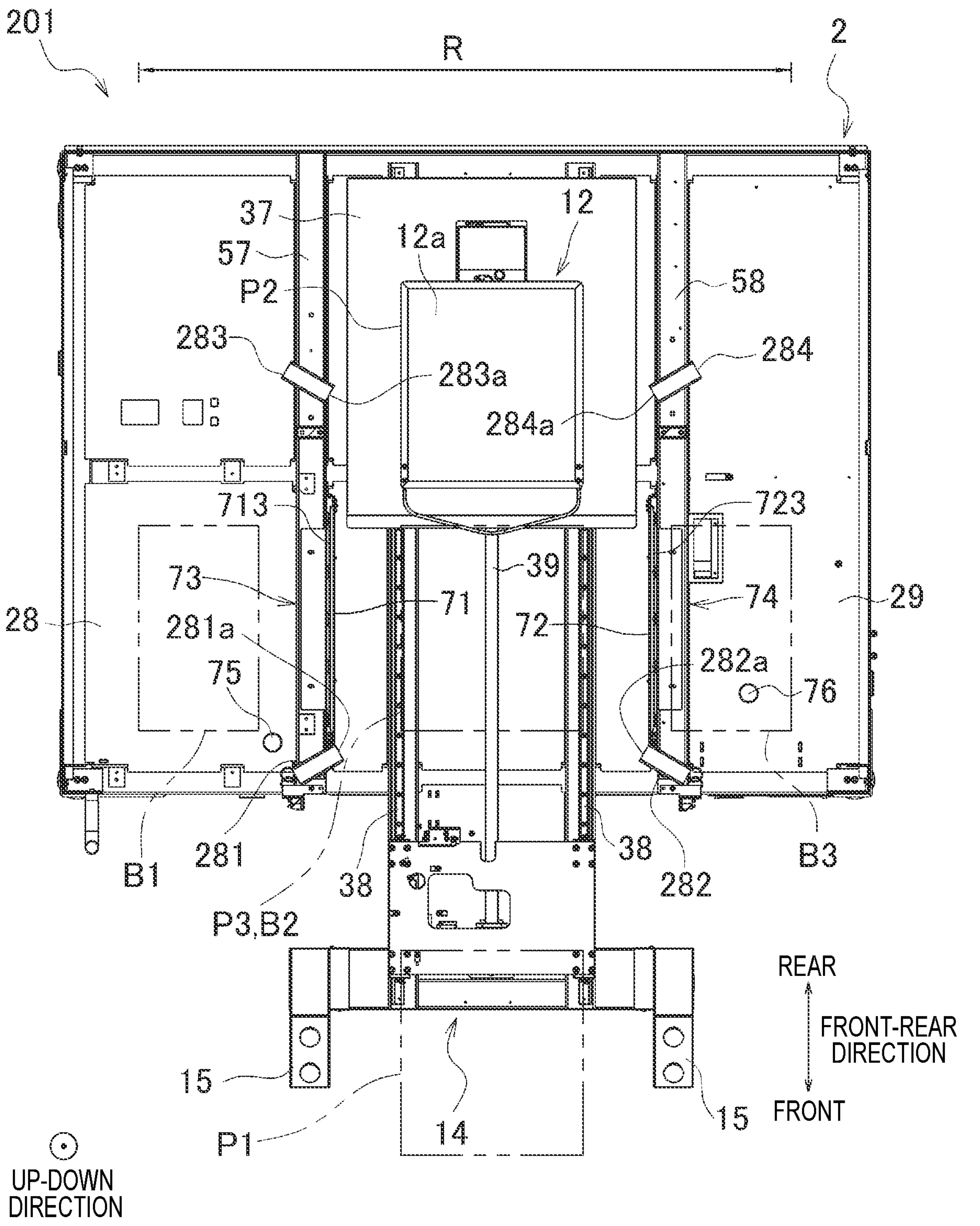
FIG. 11 is a schematic plan view of a printing device according to the present disclose.

As shown in FIG. 11, the printing device 201 according to the present disclosure includes four humidified air supply pipes 281 to 284, and is fixed to the frame body 2. These humidified air supply pipes 281 to 284 include straight pipes. The four humidified air supply pipes 281 to 284 are disposed around the platen 12 disposed at the printing position P3, the two humidified air supply pipes 281 and 282 among the four humidified air supply pipes 281 to 284 are disposed in the front, and the other two humidified air supply pipes 283 and 284 are disposed in the rear.

The four humidified air supply pipes 281 to 284 include humidified air supply ports 281*a* to 284*a* at one-end portions of the four humidified air supply pipes 281 to 284, respectively, and pipes that is not shown connected to the supply ports 75 and 76 are connected to the other end portions of the four humidified air supply pipes 281 to 284, respectively. More specifically, the pipe connected to the supply port 75 is branched into two pipes, which are connected to the two humidified air supply pipes 281 and 283 disposed on a left side. The pipe connected to the supply port 76 is branched into two pipes, which are connected to the two humidified air supply pipes 282 and 284 disposed on a right side.

The four humidified air supply pipes 281 to 284 are inclined with respect to the front-rear direction and the left-right direction such that the humidified air supply ports 281*a* to 284*a* face a support surface 12*a* side of the platen 12 disposed at the printing position P3. The two humidified air supply ports 281*a* and 282*a* face rearward, and the two humidified air supply ports 283*a* and 284*a* face forward. For example, the four humidified air supply ports 281*a* to 284*a* are disposed at positions corresponding to respective four corner portions of the support surface 12*a* of the platen 12 disposed at the printing position P3.

Figure 12:
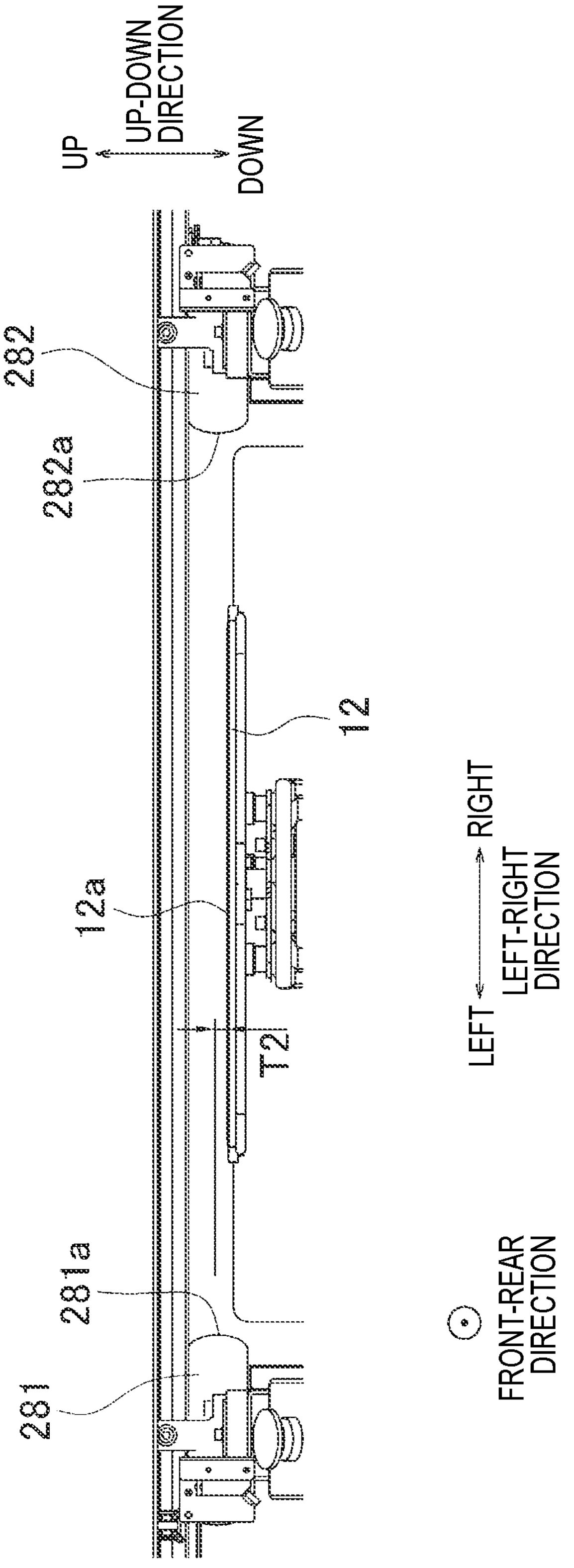
FIG. 12 is a front view of a main part of the printing device shown in FIG. 11.

As shown in FIG. 12, the four humidified air supply ports 281*a* to 284*a* are disposed at the same position in the up-down direction. More specifically, the four humidified air supply ports 281*a* to 284*a* are disposed above the platen 12 such that a distance from central axes which passes through centers of openings, of the humidified air supply ports 281*a* to 284*a* to the support surface 12*a* of the platen 12 becomes a predetermined distance T2 in the up-down direction. Further, the four humidified air supply ports 281*a* to 284*a* are opened toward a space area, which is an area between the head 30 and the support surface 12*a* in the up-down direction, above the support surface 12*a* of the platen 12 disposed at the printing position P3.

Figure 13:
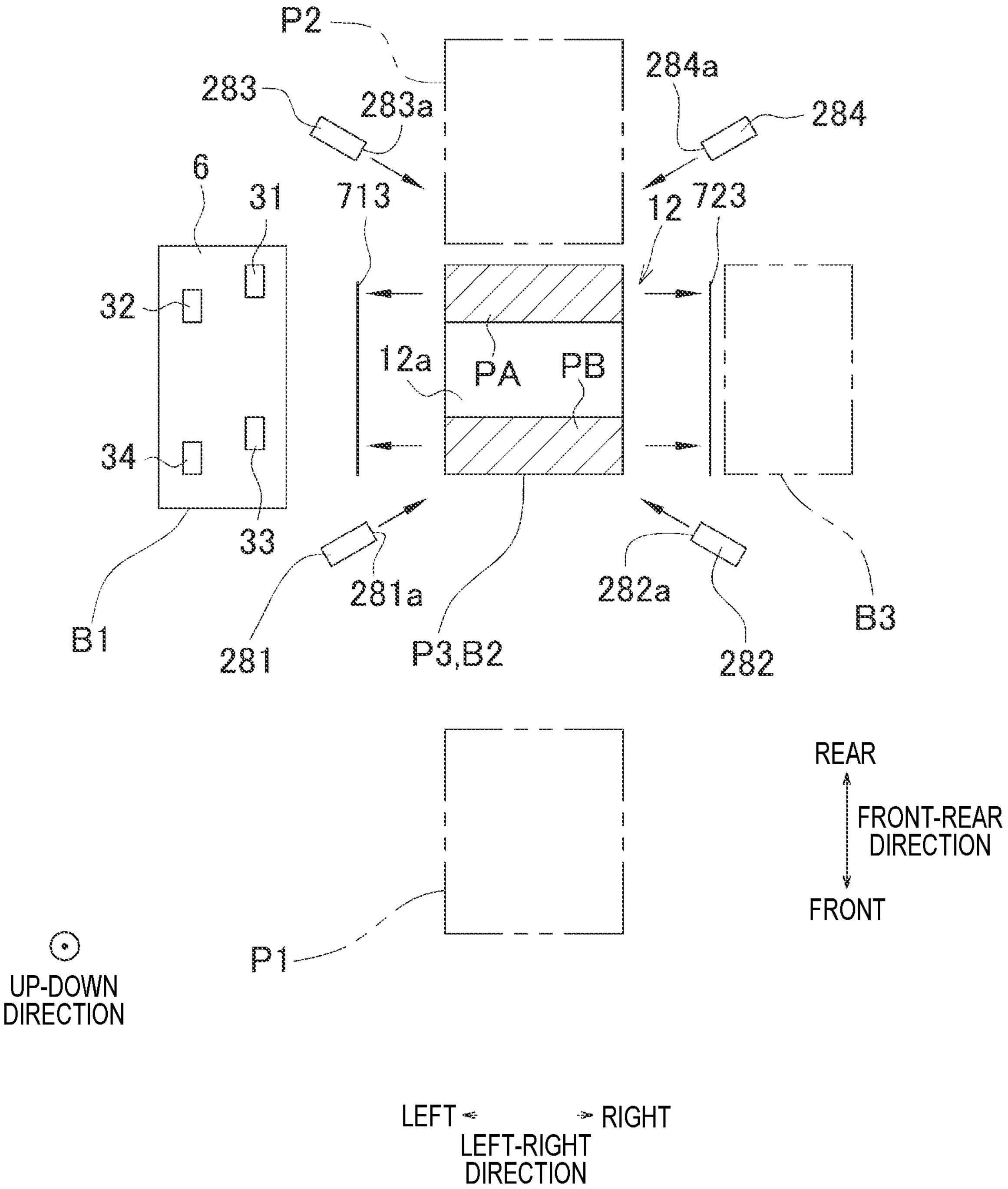
FIG. 13 is a view showing a situation when humidified air is supplied from humidified air supply ports of the printing device shown in FIG. 11.

As shown in FIG. 13, the humidified air supplied from the four humidified air supply ports 281*a* to 284*a* is supplied toward the platen 12 from near the four corner portions of the platen 12 disposed at the printing position P3, in plan view. Accordingly, a large amount of humidified air is supplied to the rear area PA and the front area PB in a space area between the platen 12 and the head 30. At this time, in a case where the suction mechanisms 73 and 74 are driven, the humidified air supplied to the rear area PA and the front area PB flows outward along the left-right direction, and is suctioned from the suction ports 713 and 723.

In the printing device 201, the humidified air is also supplied at the time of printing in the same manner as in the above-described embodiment. That is, in a case where the print start command is input, the controller 80 is configured to control the humidifier 86 such that supply of the humidified air from the four humidified air supply ports 281*a* to 284*a* is started. Accordingly, as shown in FIG. 13, the humidified air is supplied to a space area including the rear area PA and the front area PB. At this time, the controller 80 is configured to drive the fans 94 of the suction mechanisms 73 and 74. In this way, a flow of the humidified air flowing from the humidified air supply ports 281*a* to 284*a* to the suction ports 713 and 723 via the rear area PA and the front area PB is formed.

Thereafter, the controller 80 is configured to perform the same printing process as in the above-described embodiment. In the present disclosure, since the humidified air is supplied from the four humidified air supply ports 281*a* to 284*a* before the printing process is performed, in a case where the printing on the printing medium is performed, the humidified air has been supplied to the printing medium. That is, a humidified air layer is present on the printing medium. Therefore, the volatile component of the pretreatment liquid applied to the printing medium is less likely to volatilize. Even in a case where the volatile component of the pretreatment liquid volatilizes, the volatile component is less likely to reach an inside of a nozzle of the head 30 facing the printing medium.

Further, in a case where the printing on the printing medium based on the print data is finished in a state in which such a humidified air layer is present on the printing medium, the controller 80 is configured to control the humidifier 86 to stop the supply of the humidified air from the four humidified air supply ports 281*a* to 284*a*. At this time, the controller 80 is configured to stop driving the fans 94 of the suction mechanisms 73 and 74. This stops the flow of the humidified air flowing from the humidified air supply ports 281*a* to 284*a* to the rear area PA and the front area PB, and from the rear area PA and the front area PB to the suction ports 713 and 723.

The controller 80 is configured to control the sub-scanning motor 26 based on a detection result from the encoder 261 to stop the platen 12 at the support position P1. The user removes the printing medium on which an image is formed from the platen 12 disposed at the support position P1. At this time, the controller 80 is configured to control the main scanning motor 99 based on a detection result from the encoder 991 to move the carriage 6 leftward from the ejection position B2 and to stop the carriage 6 at the maintenance position B1. Further, the controller 80 is configured to perform capping of the head 30 with the cap of the maintenance unit. In this way, a flow at the time of printing ends.

As described above, in the printing device 201, the same effect can be achieved in the same configuration as that of the above-described embodiment. The four humidified air supply ports 281*a* to 284*a* are disposed at positions corresponding to respective four corner portions of the support surface 12*a* of the platen 12 disposed at the printing position P3, in plan view. Accordingly, the humidified air can be effectively supplied to the support surface 12*a* of the platen 12. Therefore, at the printing position P3, the volatile component of the pretreatment liquid applied to the printing medium is less likely to volatilize, and the volatile component itself of the pretreatment liquid is less likely to reach the nozzle.

In addition, in the above-described embodiment, the printing medium to which the pretreatment liquid is applied in advance is disposed on the platen 12 and the printing is performed on the printing medium, but the printing devices 1 and 201 may include a pretreatment liquid application mechanism that applies, to the printing medium, the pretreatment liquid containing the same volatile component as described above. The same components as those of the above-described embodiment are denoted by the same reference numerals, and a description thereof will be omitted.

Figure 14:
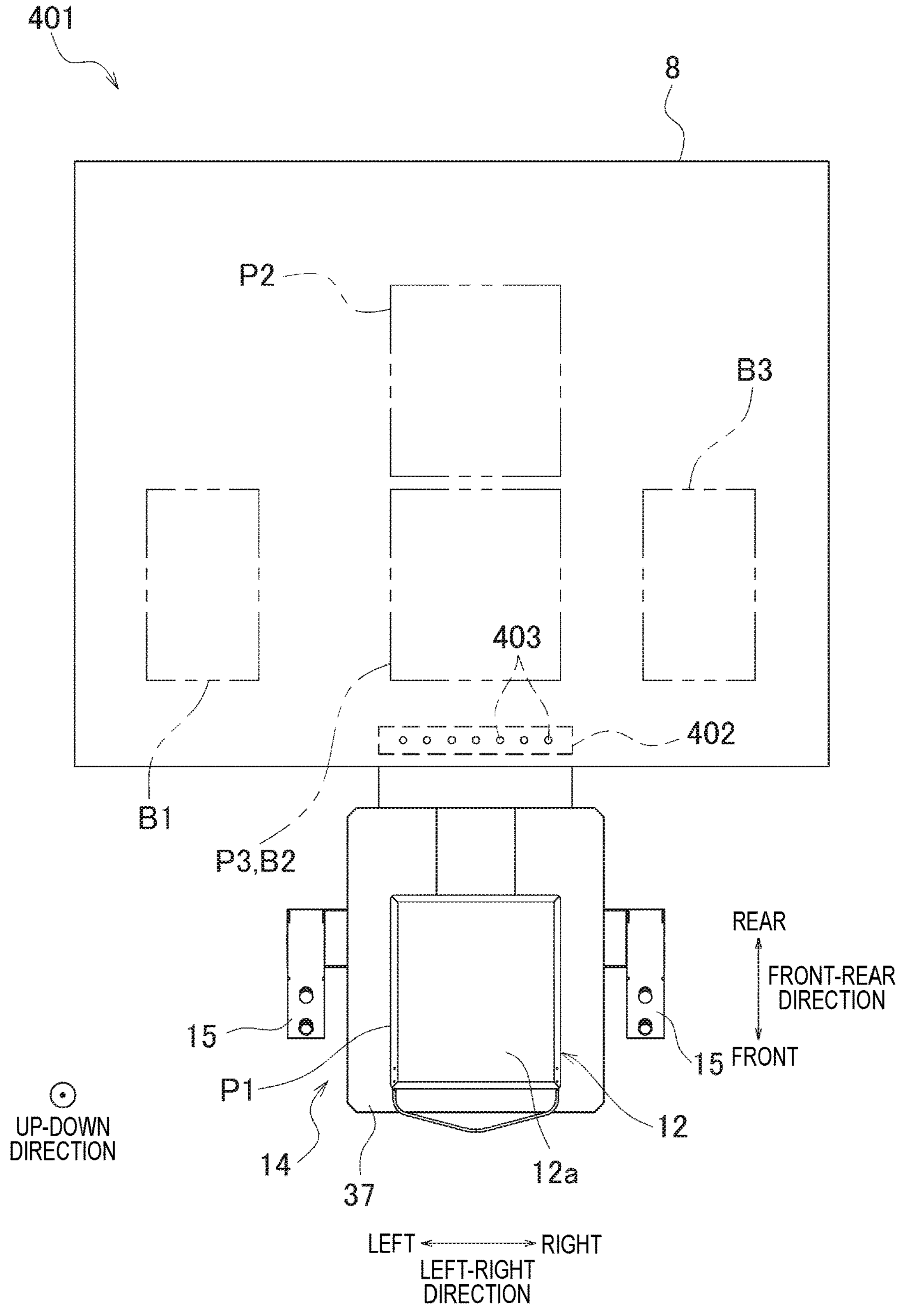
FIG. 14 is a schematic plan view of a printing device.

In a printing device 401, as shown in FIG. 14, a pretreatment liquid application mechanism 402 is disposed between the support position P1 and the printing position P3 in the front-rear direction. The pretreatment liquid application mechanism 402 is disposed inside the housing 8 and above the support surface 12*a* of the platen 12. The pretreatment liquid application mechanism 402 includes a plurality of nozzles 403 configured to eject a pretreatment liquid downward in a mist form. The plurality of nozzles 403 are arranged side by side along the left-right direction such that the pretreatment liquid is sprayed onto an entire upper surface of the printing medium. A reservoir (not shown) configured to store the pretreatment liquid is provided in the printing device 401, and the pretreatment liquid is supplied from the reservoir to the pretreatment liquid application mechanism 402.

In the printing device 401, in a case where printing is performed, since the pretreatment liquid application mechanism 402 is provided, the user places a printing medium (T-shirt) to which the pretreatment liquid is not applied in advance on the support surface 12*a* of the platen 12 before operating the operation portions 15 and inputting a print start command. The platen 12 is disposed at the support position P1 in a case where the printing is not performed.

Thereafter, in a case where the print start command is input, the controller 80 is configured to control the sub-scanning motor 26 based on a detection result from the encoder 261 to move the platen 12 from the support position P1 to the pre-printing standby position P2. At this time, the controller 80 is configured to control the pretreatment liquid application mechanism 402 to spray the pretreatment liquid onto the printing medium in the mist form in a case where the printing medium passes through an area facing the plurality of nozzles 403. Accordingly, the pretreatment liquid can be applied to the upper surface of the printing medium.

Next, the controller 80 is configured to control the humidifier 86 to supply humidified air in the same manner as in the above-described embodiment. At this time, the controller 80 is configured to drive the fans 94 of the suction mechanisms 73 and 74. Thereafter, the controller 80 is configured to perform a printing process in the same manner as in the above-described embodiment.

Thereafter, in a case where the printing on the printing medium based on print data is finished in a state in which a humidified air layer is present on the printing medium, the controller 80 is configured to control the humidifier 86 to stop the supply of the humidified air. At this time, the controller 80 is configured to stop driving the fans 94 of the suction mechanisms 73 and 74. The controller 80 is configured to control the sub-scanning motor 26 based on a detection result from the encoder 261 to stop the platen 12 at the support position P1. The user removes the printing medium on which an image is formed from the platen 12 disposed at the support position P1. At this time, the controller 80 is configured to control the main scanning motor 99 based on a detection result from the encoder 991 to move the carriage 6 leftward from the ejection position B2 and to stop the carriage 6 at the maintenance position B1. Further, the controller 80 is configured to perform capping of the head 30 with the cap of the maintenance unit. In this way, a flow at the time of printing ends.

As described above, since the printing device 401 includes the pretreatment liquid application mechanism 402, it is possible to apply the pretreatment liquid to the printing medium. Therefore, it is not necessary to apply the pretreatment liquid to the printing medium in advance. The pretreatment liquid application mechanism 402 is configured to spray the pretreatment liquid onto the printing medium in the mist form. Accordingly, it is possible to apply a large amount of pretreatment liquid over a wide range of the printing medium in a short time. By applying the large amount of the pretreatment liquid to the printing medium in a short time in this way, the volatile component of the pretreatment liquid from the printing medium increases. Even in such a situation, since it is possible to supply the humidified air as described above, it is possible to effectively reduce an occurrence of a problem due to a reaction between ink in a nozzle and the volatile component of the pretreatment liquid. The pretreatment liquid application mechanism 402 is not particularly limited as long as the pretreatment liquid can be applied to the printing medium. For example, the pretreatment liquid may be applied to the printing medium by a roller, or the pretreatment liquid may be discharged from the nozzle in a form other than the mist form and applied to the printing medium. In the printing device 401, the same effect can be achieved in the same configuration as that of the above-described embodiment.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

In the above-described embodiment, the supply of the humidified air is started until the ink is ejected from the nozzle of the head 30 after the print start command is input, but the supply of the humidified air may be started before the printing is finished after the ink is ejected from the nozzle of the head 30. In this case, it is also possible to reduce the occurrence of the problem due to the reaction between the ink in the nozzle and the volatile component of the pretreatment liquid. The supply of the humidified air may be continued while a power supply of the printing device is in an ON state. Further, in the above-described embodiment, the supply of the humidified air is continuously performed from a time when the print start command is input until the printing is terminated, but may be performed intermittently. Regardless of an arrangement position of the head 30, the humidified air may be supplied only in a case where the platen 12 is disposed at the printing position P3, or the humidified air may be supplied only in a case where the head 30 and the platen 12 face each other.

In the above-described embodiment, the supply ports 75 and 76 and the humidified air supply pipes 81, 82, and 281 to 284 are connected by the pipes to supply the humidified air, but the humidifier 86 and the humidified air supply pipes 81, 82, and 281 to 284 may be connected by the pipes to supply the humidified air to the space area above the platen 12 disposed at the printing position P3. In this case, the humidified air may be supplied into the housing 8 from the supply ports 75 and 76 ("humidified air supply ports" of the present disclosure) provided around the platen 12 disposed at the printing position P3, and the humidified air may be supplied to the space area between the platen 12 and the head 30 in the vertical direction by an air flow due to an exhaust from the fans 94 and a suction force of air in the housing 8 caused by the suction ports 713 and 723. In this way, it is possible to effectively reduce the occurrence of the problem due to the reaction between the ink inside the nozzle and the volatile component of the pretreatment liquid.

The humidified air supply ports **81*a*1, 81*b*1, 82*a*1, 82*b*1, and 281*a* to 284*a* may be opened such that the central axes of the humidified air supply ports 81*a*1, 81*b*1, 82*a*1, 82*b*1, and 281*a* to 284*a* face the support surface 12*a* of the platen 12 disposed at the printing position P3. The humidified air supply ports 81*a*1, 81*b*1, 82*a*1, 82*b*1, and 281*a* to 284*a* may be disposed below the support surface 12*a* of the platen 12 in the up-down direction. In this case, it is desirable that the humidified air supply ports 81*a*1, 81*b*1, 82*a*1, 82*b*1, and 281*a* to 284*a* are opened toward the space area above the support surface 12*a* of the platen 12 disposed at the printing position P3. One or more humidified air supply ports may be provided around the platen 12 disposed at the printing position P3, and supply the humidified air to the support surface 12*a* of the platen 12**.

The number of fans 94 described above may be one or more and two or less, or four or more. Further, the fans 94 and the suction ports 713 and 723 may not be provided. The printing devices 1, 201, and 401 may not include the humidifier 86, and in this case, the humidified air generated outside may be sent to the humidified air supply port via the pipe or the like.

The platen 12 in the above-described embodiment is moved along the sub-scanning direction (front-rear direction) together with the printing medium by the conveyance mechanism 14, but the platen 12 may be disposed in a manner of not being movable to the printing position P3. In this case, the platen 12 is only required to support, at the printing position P3, the printing medium (for example, paper or roll paper) to be conveyed.

The head 30 in the above-described embodiment has been described as an example in which the present disclosure is applied to a printing device including a serial head configured to eject inks from a plurality of nozzles while being moved along the main scanning direction (left-right direction) by the moving mechanism 77, but the present disclosure is not limited thereto. For example, the present disclosure may be applied to a printing device including a line head that extends over an entire length of the printing medium (platen 12) in the main scanning direction and is disposed in a manner of not being movable to the ejection position B2.

In the above-described embodiment, a microcomputer, an application specific integrated circuits (ASIC), a field programmable gate array (FPGA), or the like may be used as a processor instead of the CPU 80*a*. In this case, main processing may be distributed by a plurality of processors. A non-transitory storage medium such as the ROM 80*b* and the flash memory 80*d* may be any storage medium configured to keep information regardless of a storage period of the information. The non-transitory storage medium may not include a transitory storage medium (for example, a signal to be transmitted). For example, the control program may be downloaded (that is, transmitted as a transmission signal) from a server connected to a network (not shown) and stored in the ROM 80*b* or the flash memory 80*d*. In this case, the control program may be stored in the non-transitory storage medium such as an HDD provided in the server. In the above-described embodiment and modifications, the volatile component of the pretreatment liquid contains the organic acid, but the present disclosure is not limited thereto. That is, the volatile component of the pretreatment liquid may include a component other than the organic acid, which reacts with the ink in the nozzle to cause aggregation or discoloration.

What is claimed is:

1. A printing device comprising:

a head including a nozzle configured to eject ink;

a platen including a support surface configured to support a printing medium to which pretreatment liquid is applied, the pretreatment liquid containing a volatile component that reacts with the ink; and a humidified air supply port configured to supply humidified air from a humidifier to the support surface of the platen that supports the printing medium, the humidified air supply port being provided around the platen in which the support surface of the platen is disposed at a printing position facing the nozzle.

2. The printing device according to claim 1, further comprising:

a pair of inner walls disposed apart from each other and extending along one direction; and a moving mechanism configured to move the platen in the one direction between the printing position and a support position at which the platen supports the printing medium, at a position between the pair of inner walls, the support position being a position different from the printing position, wherein, in a direction orthogonal to the one direction, the humidified air supply port is disposed between the pair of inner walls.

3. The printing device according to claim 2, further comprising:

a fan; and a suction port through which air is suctioned by the fan, the suction port being provided along the inner wall, wherein, in the direction orthogonal to the one direction, the humidified air supply port is disposed at a position where at least a part of the platen, which is disposed at the printing position, is disposed between the humidified air supply port and the suction port.

4. The printing device according to claim 1, wherein the humidified air supply port faces a side of the support surface.

5. The printing device according to claim 1, wherein the support surface has a quadrangular shape, the printing device includes at least four of the humidified air supply ports, and in plan view, the four of the humidified air supply ports are disposed at positions corresponding to respective four corner portions of the support surface.

6. The printing device according to claim 1, wherein the support surface has a quadrangular shape, the printing device includes at least two of the humidified air supply ports, and in plan view, the two of the humidified air supply ports are disposed at positions corresponding to respective central portions of two opposing sides of the support surface.

7. The printing device according to claim 1, further comprising:

a humidified air generator configured to generate the humidified air; and a controller configured to control the humidified air generator to generate the humidified air and supply the humidified air from the humidified air supply port, until the ink is ejected from the nozzle after a print start command that causes the nozzle to eject the ink to print on the printing medium is input.

8. The printing device according to claim 7, wherein the controller is configured to control the humidified air generator to supply the humidified air from the humidified air supply port in a case where the platen is located at the printing position.

9. The printing device according to claim 1, further comprising:

a pretreatment liquid application mechanism configured to apply the pretreatment liquid to the printing medium.

10. The printing device according to claim 9, wherein the pretreatment liquid application mechanism is configured to spray, in a mist form, the pretreatment liquid onto the printing medium.

11. The printing device according to claim 1, wherein the pretreatment liquid contains an organic acid, as the volatile component.

* * * * *